United States Patent
Lin et al.

(10) Patent No.: US 11,994,692 B2
(45) Date of Patent: May 28, 2024

(54) OPTICAL ELEMENT DRIVING MECHANISM

(71) Applicant: TDK TAIWAN CORP., Taoyuan (TW)

(72) Inventors: Meng-Ting Lin, Taoyuan (TW); Sin-Jhong Song, Taoyuan (TW)

(73) Assignee: TDK TAIWAN CORP., Taoyuan (TW)

( * ) Notice: Subject to any disclaimer, the term of this patent is extended or adjusted under 35 U.S.C. 154(b) by 172 days.

(21) Appl. No.: 17/689,532

(22) Filed: Mar. 8, 2022

(65) Prior Publication Data

US 2022/0197051 A1    Jun. 23, 2022

Related U.S. Application Data

(63) Continuation of application No. 16/740,812, filed on Jan. 13, 2020, now Pat. No. 11,300,803.

(60) Provisional application No. 62/814,543, filed on Mar. 6, 2019.

(30) Foreign Application Priority Data

Dec. 20, 2019  (EP) .................................... 19218896

(51) Int. Cl.
| | | |
|---|---|---|
| *G02B 7/02* | (2021.01) | |
| *G02B 7/08* | (2021.01) | |
| *G02B 7/09* | (2021.01) | |
| *G02B 7/10* | (2021.01) | |
| *G02B 27/64* | (2006.01) | |
| *G03B 13/36* | (2021.01) | |

(Continued)

(52) U.S. Cl.
CPC ............ *G02B 27/646* (2013.01); *G02B 7/08* (2013.01); *G02B 7/09* (2013.01); *G02B 7/10* (2013.01); *G03B 13/36* (2013.01); *H02K 11/215* (2016.01); *H02K 41/0356* (2013.01)

(58) Field of Classification Search
CPC .......... G02B 27/646; G02B 7/08; G02B 7/09; G02B 7/10; G03B 13/36; G03B 2205/0069; G03B 3/10; G03B 30/00; H02K 11/215; H02K 41/0356; H04N 23/54; H04N 23/57
USPC ........................................................ 359/554
See application file for complete search history.

(56) References Cited

U.S. PATENT DOCUMENTS

| | | | |
|---|---|---|---|
| 8,041,201 B2 | 10/2011 | Eromak | |
| 2009/0252488 A1* | 10/2009 | Eromaki | G02B 27/646 |
| | | | 396/529 |

(Continued)

*Primary Examiner* — William R Alexander
(74) *Attorney, Agent, or Firm* — Muncy, Geissler, Olds & Lowe, P.C.

(57) ABSTRACT

An optical element driving mechanism is provided. The optical element driving mechanism includes a bottom, a movable part, a driving assembly, a first circuit assembly, and a second circuit assembly. The movable part is connected to an optical element with an optical axis. The movable part is movable relative to the bottom. The driving assembly drives the movable part to move relative to the bottom. The first circuit assembly is disposed on the bottom and electrically connected to the driving assembly. The second circuit assembly is electrically connected to the driving assembly. At least part of the second circuit assembly is embedded in and not revealed from the bottom. The driving assembly is electrically connected to the first circuit assembly via the second circuit assembly.

20 Claims, 20 Drawing Sheets

(51) Int. Cl.
*H02K 11/215* (2016.01)
*H02K 41/035* (2006.01)

(56) References Cited

U.S. PATENT DOCUMENTS

| | | | |
|---|---|---|---|
| 2013/0215526 A1* | 8/2013 | Park | H02K 41/0356 |
| | | | 310/12.16 |
| 2014/0098434 A1* | 4/2014 | Baik | G02B 7/08 |
| | | | 359/824 |
| 2014/0184899 A1* | 7/2014 | McKinley | G03B 5/00 |
| | | | 348/373 |
| 2015/0130990 A1* | 5/2015 | Cho | G03B 13/36 |
| | | | 348/357 |
| 2016/0209621 A1 | 7/2016 | Park | |
| 2016/0274328 A1 | 9/2016 | Shin | |
| 2016/0320585 A1 | 11/2016 | Park | |
| 2016/0373000 A1 | 12/2016 | Park | |
| 2017/0090148 A1 | 3/2017 | Park | |
| 2017/0146773 A1 | 5/2017 | Park | |
| 2017/0299843 A1 | 10/2017 | Lee | |
| 2019/0265506 A1 | 8/2019 | Park | |

\* cited by examiner

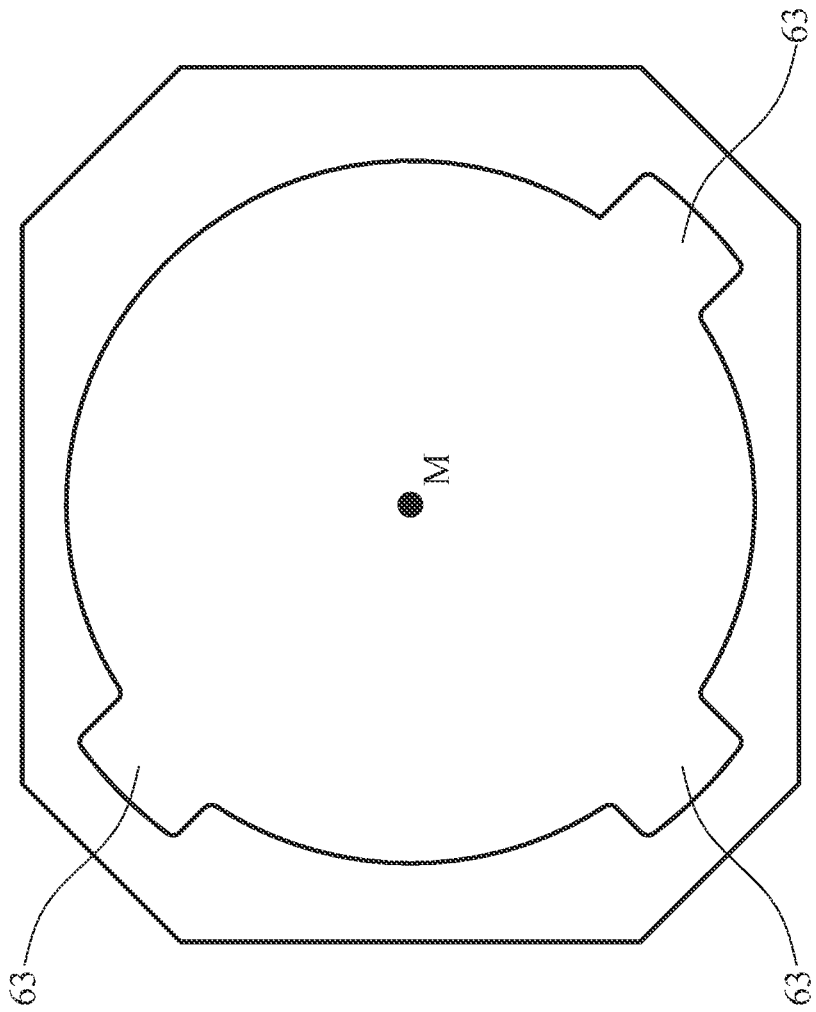
FIG. 5
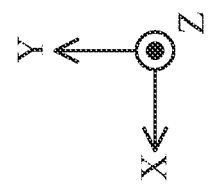

OPTICAL ELEMENT DRIVING MECHANISM

CROSS-REFERENCE TO RELATED APPLICATIONS

The present application is a Continuation of U.S. patent application Ser. No. 16/740,812, filed Jan. 13, 2020, which claims priority of U.S. Provisional Patent Application No. 62/814,543, filed Mar. 6, 2019, and European Patent Application No. 19218896.9, filed Dec. 20, 2019, the entirety of which is incorporated by reference herein.

BACKGROUND OF THE DISCLOSURE

Field of the Disclosure

The present disclosure relates to a driving mechanism, and more particularly to an optical element driving mechanism.

Description of the Related Art

As technology has developed, nowadays many electronic devices (such as a tablet computers and smartphones) are equipped with the functionality of shooting images and recording video. A user may operate an electronic device to capture various images and video thanks to an optical element and an optical element driving mechanism disposed on the electronic device.

When the user uses the electronic device equipped with the optical element driving mechanism, shock or vibration may occur, and this may cause the image or video to come out blurry. Demand for higher quality in images or videos is increasing, and an optical element driving mechanism that is able to achieve auto focus (AF) is required in order to focus on the scene.

SUMMARY OF THE DISCLOSURE

According to some embodiments of the disclosure, an optical element driving mechanism is provided. The optical element driving mechanism includes a bottom, a movable part, a driving assembly, a first circuit assembly, and a second circuit assembly. The movable part is connected to an optical element with an optical axis. The movable part is movable relative to the bottom. The driving assembly drives the movable part to move relative to the bottom. The first circuit assembly is disposed on the bottom and electrically connected to the driving assembly. The second circuit assembly is electrically connected to the driving assembly. At least part of the second circuit assembly is embedded in and not revealed from the bottom. The driving assembly is electrically connected to the first circuit assembly via the second circuit assembly.

BRIEF DESCRIPTION OF THE DRAWINGS

FIG. 5 is a top view of a circuit assembly.

DETAILED DESCRIPTION OF THE DISCLOSURE

The following disclosure provides many different embodiments, or examples, for implementing different features of the provided subject matter. Specific examples of components and arrangements are described below to simplify this disclosure. These are, of course, merely examples and are not intended to be limiting. For example, the formation of a first feature "on" or "above" a second feature in the description that follows may include embodiments in which the first and second features are formed in direct contact, and may also include embodiments in which additional features may be formed between the first and second features, so that the first and second features may not be in direct contact. Ordinal terms such as "first", "second", etc., used in the description and in claims do not by themselves connote any priority, precedence, or order of one element over another, but are used merely as labels to distinguish one element from another element having the same name. In addition, in different examples of this disclosure, symbols or alphabets may be used repeatedly.

Furthermore, spatially relative terms, such as "above" and the like, may be used herein for ease of description to describe one element or feature's relationship to another element or feature as illustrated in figures. The spatially relative terms are intended to encompass different orientations of the device in use or operation in addition to the orientation depicted in figures. The apparatus may be otherwise oriented (rotated 90 degrees or at other orientations) and the spatially relative descriptors used herein may likewise be interpreted accordingly.

The embodiments of this disclosure are described with the drawings.

Figure 1:
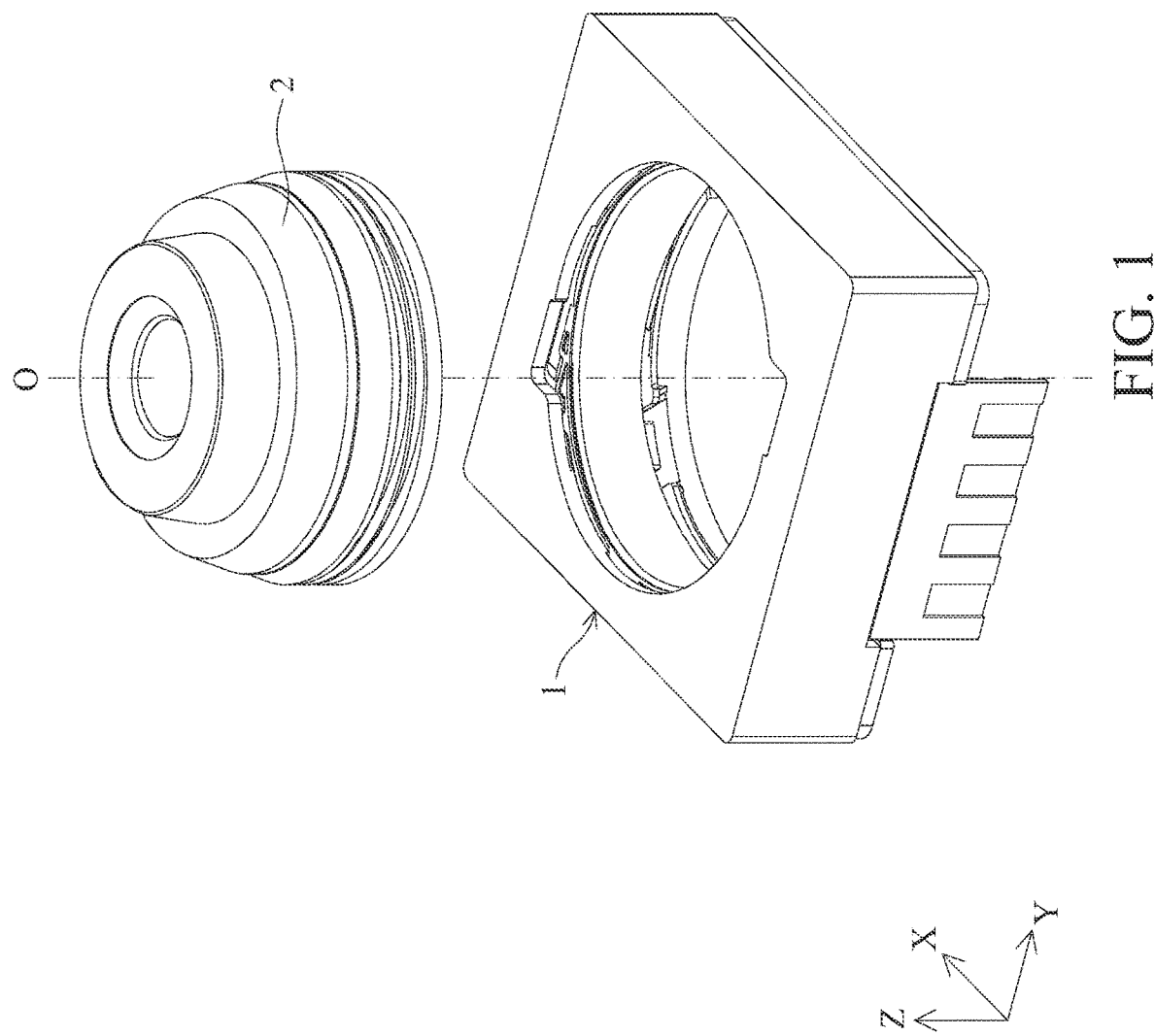
FIG. 1 is a perspective view of an optical element driving mechanism and an optical element in accordance with some embodiments of this disclosure.
Figure 2:
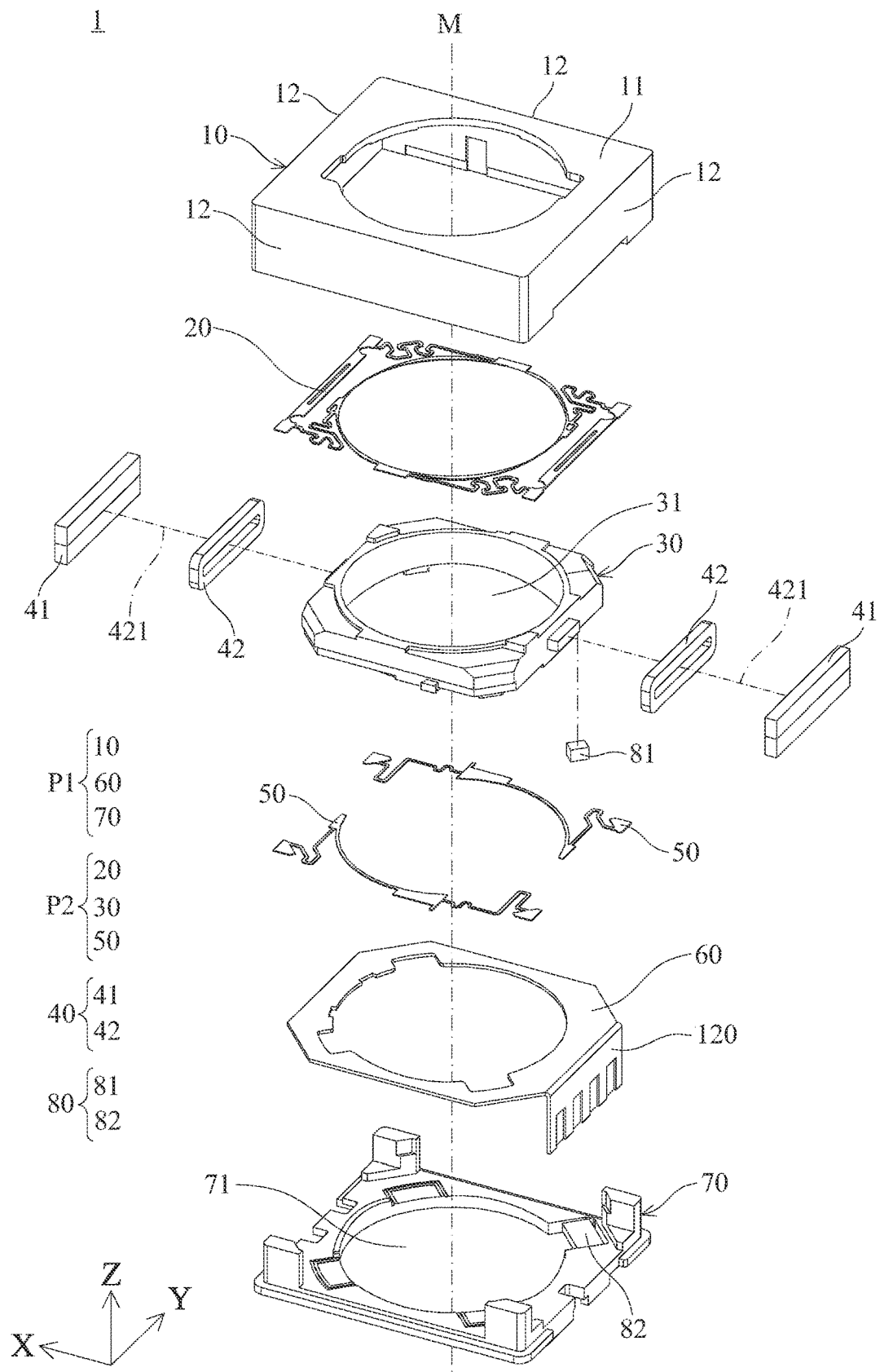
FIG. 2 is an exploded view of the optical element driving mechanism in FIG. 1.

FIG. 1 is a perspective view of an optical element driving mechanism 1 and an optical element 2 in accordance with some embodiments of this disclosure. When an electronic device (e.g. a smart phone) is provided with the optical element driving mechanism 1, the optical element driving mechanism 1 may be disposed in the front of the smart phone as a front lens along with the optical element 2. The optical element 2 has an optical axis O. The optical axis O is an imaginary axis passing through the center of the optical element 2. FIG. 2 is an exploded view of the optical element driving mechanism 1 in FIG. 1. The optical element driving mechanism 1 includes a fixed part P1, a movable part P2, a driving assembly 40, and a sensing assembly 80. The movable part P2 moves relative to the fixed part P1. The movable part P2 may hold the optical element 2. The driving assembly 40 drives the movable part P2 to move relative to the fixed part P1. The sensing assembly 80 senses the movement of the movable part P2 relative to the fixed part P1.

The fixed part P1 has a main axis M. The main axis M passes through the center of the optical element driving mechanism 1. It should be noted that when the optical element 2, the optical element driving mechanism 1 and a light-detection element (not shown) (e.g. a charge-coupled detector, CCD) are aligned, the optical axis O of the optical element 2 also passes through the center of the optical element driving mechanism 1 so that the optical axis O of the optical element 2 coincides with the main axis M of the fixed part P1. However, movement, vibration, or tilt of the movable part P2 may cause the optical axis O of the optical element 2 not coincide with the main axis M of the fixed part P1 because the optical element 2 is disposed in the movable part P2.

In this embodiment, the fixed part P1 includes a case 10, a circuit assembly 60, and a bottom 70. The movable part P2 includes a first elastic element 20, a holder 30, and two second elastic elements 50. The driving assembly 40 includes two magnetic elements 41 and two coils 42. The sensing assembly 80 includes a sensed object 81 and a sensor 82. It should be noted that the elements may be added or omitted according with the requirements of the users.

The case 10, the circuit assembly 60, and the bottom 70 of the fixed part P1 are arranged sequentially along the main axis M. The case 10 is located over the circuit assembly 60 and the bottom 70. The case 10 may be made of metal material or non-metal material such as plastics. The case 10 made of non-metal material may isolate electromagnetic wave. In this way, the electromagnetic wave interference generated by an antenna close to the optical element driving mechanism 1 may be reduced.

The case 10 includes a top surface 11 and four sidewalls 12 extending from the edge of the top surface 11 along the main axis M. The bottom 70 has an opening 71. The sidewalls 12 of the case 10 are connected to the bottom 70 and the space formed therein may accommodate the movable part P2, the driving assembly 40, and the sensing assembly 80, and the like.

The circuit assembly 60 is disposed on the bottom 70. The circuit assembly 60 may be a circuit board such as a flexible print circuit (FPC) or a flexible-hard composite board. The circuit assembly 60 is connected to an outside-connection circuit member 120. The current may be supplied to the optical element driving mechanism 1 via the outside-connection circuit member 120. How the current flows through the optical element driving mechanism 1 is described in detail in the following content.

The first elastic element 20, the holder 30, and the second elastic elements 50 of the movable part P2 are arranged along the main axis M sequentially. The holder has a through hole 31 for holding the optical element 2. A screw and its corresponding threaded structure may be configured between the through hole 31 and the optical element 2, so that the optical element 2 may be affixed in the holder 30.

The first elastic element 20 and the second elastic elements 50 may be made of metal material. The holder 30 may be movably connected to the case 10 and the bottom 70 by being held elastically by the first elastic element 20 and the second elastic elements 50. Held between the first elastic element 20 and the second elastic elements 50, the holder 30 is not in direct contact with the case 10 and the bottom 70. Additionally, the range of motion of the holder 30 is also restricted to avoid the holder and the optical element 2 therein get damaged because of collision with the case 10 or the bottom 70 when the optical element driving mechanism 1 moves or is impacted.

The position of each of the magnetic elements 41 of the driving assembly corresponds to the position of each of the coils 42 of the driving assembly 40. The magnetic elements 41 and the coils 42 are disposed close to the holder 30. The magnetic elements 41 may be permanent magnets. The arrangement direction of the pair of magnetic poles (N-pole and S-pole) of the magnetic elements 41 is parallel to the main axis M. The magnetic elements 41 and the coil 42 are substantially rectangular. The long side of each of the magnetic elements 41 corresponds to the long side of each of the coils 42. When the current is supplied to the coils 42, magnetic force may be generated between the magnetic elements 41 and the coils 42 for driving the holder 30 and the optical element 2 therein to move along the optical axis O. Each of the coils 42 has a winding axis 421 that is perpendicular to the main axis M and parallel to the plane on which the circuit assembly 60 is located. Compared to the configuration of the winding axis 421 that is parallel to the main axis M, the configuration of the coils 42 in this embodiment may reduce the size of the optical element driving mechanism 1 in a direction that is perpendicular to the main axis M. Furthermore, when viewed along the main axis M, the driving assembly 40 partially overlaps the circuit assembly 60, which may also reduce the size of the optical element driving mechanism 1 in a direction that is perpendicular to the main axis M.

Figure 3:
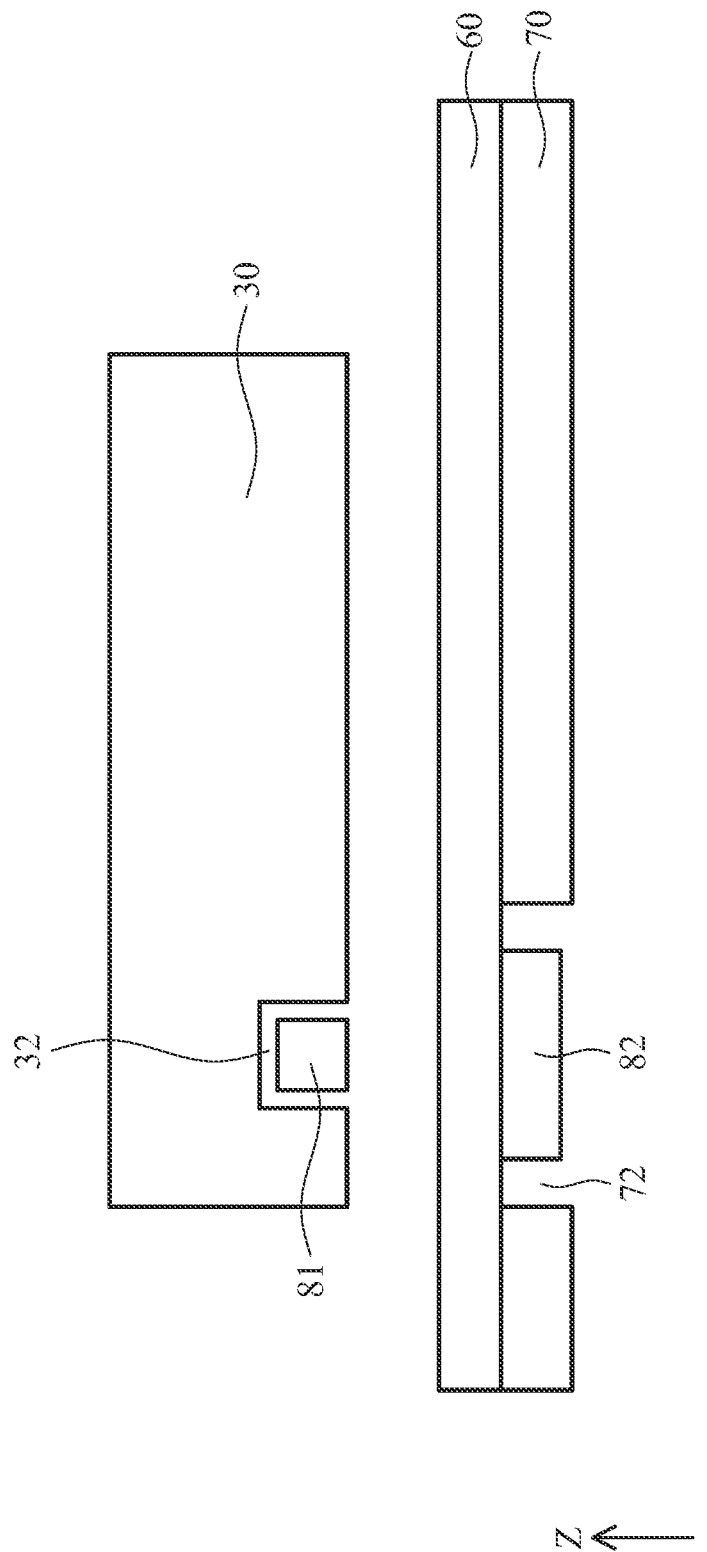
FIG. 3 is a schematic view of the optical element driving mechanism.

The position of the sensed object 81 of the sensing assembly 80 corresponds to the position of the sensor 82 of the sensing assembly 80. Please refer to FIG. 3 first. FIG. 3 is a schematic view of the optical element driving mechanism 1. The sensed object 81 is disposed close to the holder 30. The holder 30 includes a receiving space 32 for receiving the sensed object 81. The sensor 82 is disposed on the bottom 70. Particularly, the sensor 82 is mounted to the surface of the circuit assembly 60 that faces the bottom 70 by surface mount technology (SMT) and the like. The bottom 70 includes a receiving portion 72 for receiving the sensor 82. The receiving portion 72 may penetrate through (e.g. as a through hole) or may not penetrate through (e.g. as a recess) the bottom 70. Therefore, the circuit assembly 60 is disposed between the holder 30 and the sensor 82. The sensed object 81 may be a magnetic element such as a magnet. The sensor 82 may be a giant magneto resistance (GMR) sensor, a tunneling magneto resistance (TMR) sensor, and the like. When the holder moves, the sensed object 81 close to the holder 30 also moves, and thus the magnetic field of the sensed object 81 changes. The sensor 82 may sense the change of the magnetic field of the sensed object 81 in order to know the position of the holder and adjust the position of the holder 30, achieving the effects of controlling the movement of the holder 30.

Figure 4:
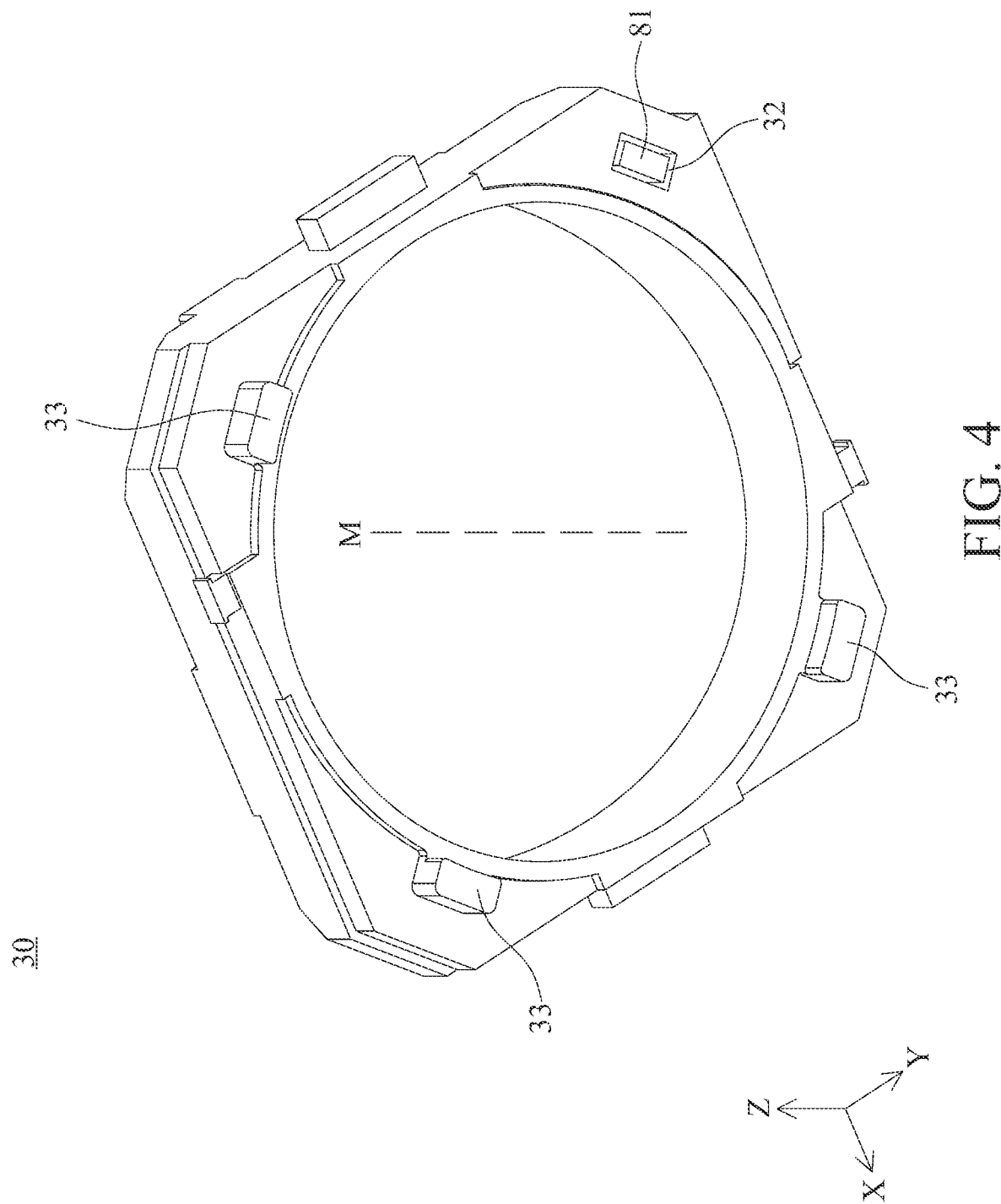
FIG. 4 is a perspective view of a holder.
Figure 6:
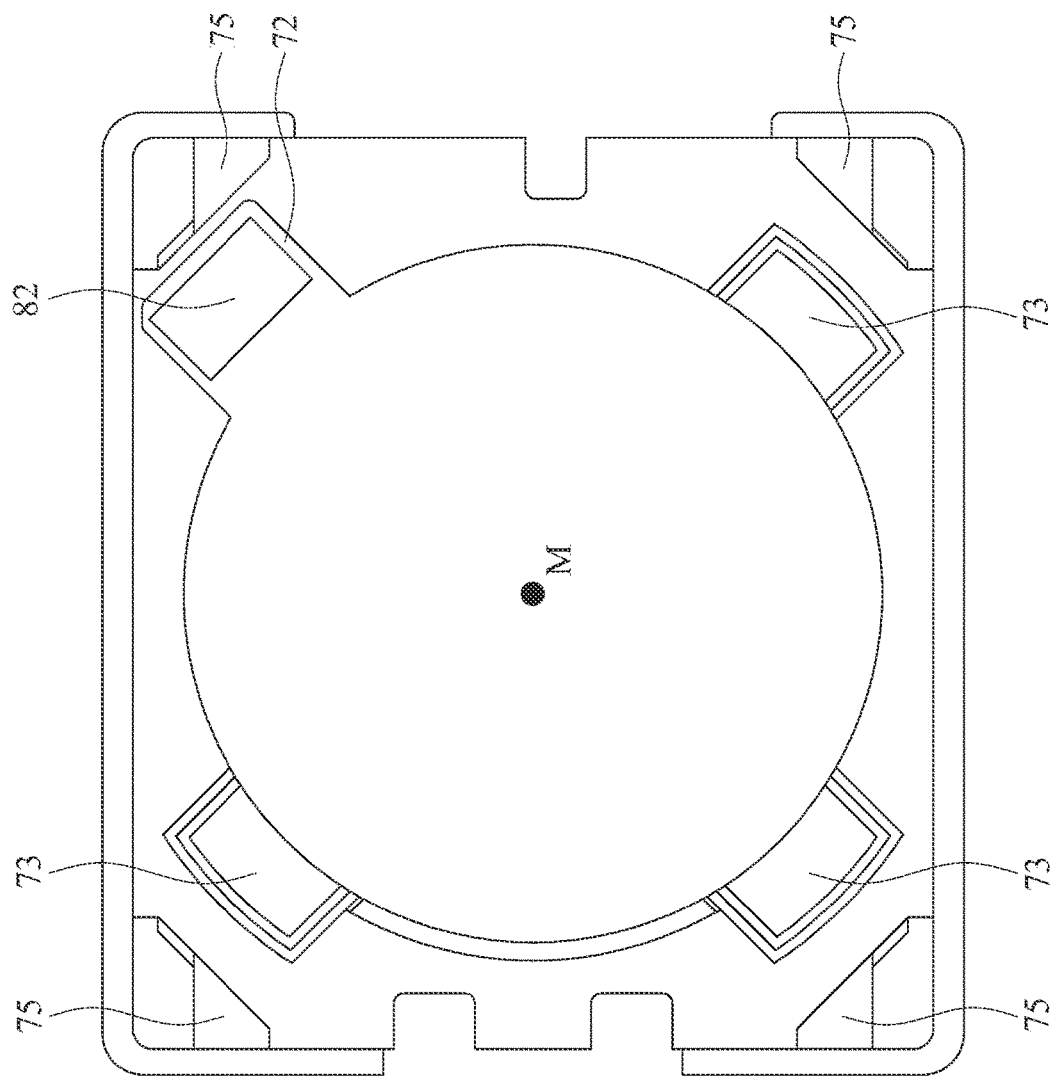
FIG. 6 is a top view of a bottom.
Figure 7:
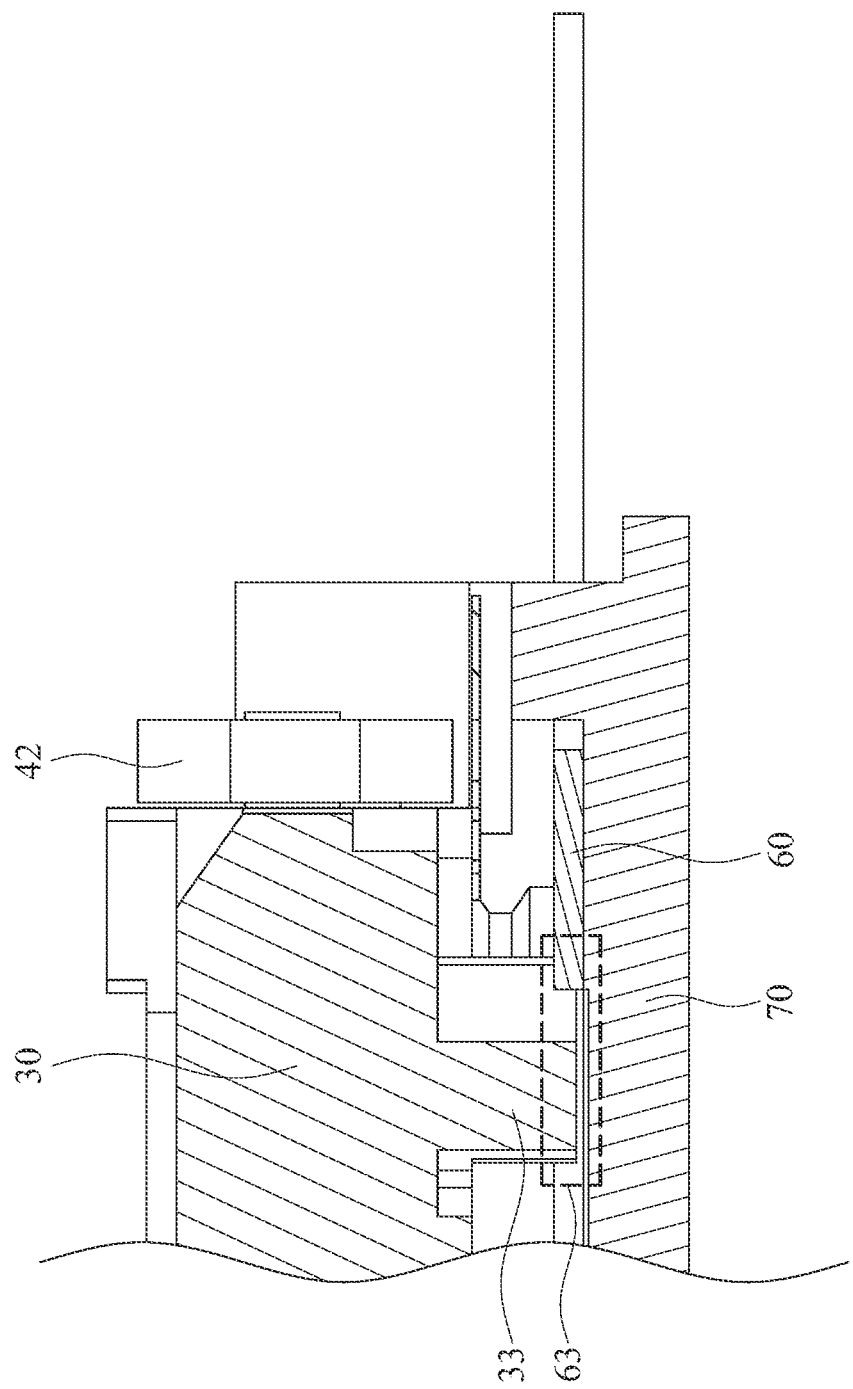
FIG. 7 is a cross-sectional view of a portion of the optical element driving mechanism.

Next, please refer to FIG. 4 to FIG. 7. FIG. 4 is a perspective view of the holder 30. FIG. 5 is a top view of the circuit assembly 60. FIG. 6 is a top view of the bottom 70. FIG. 7 is a cross-sectional view of a portion of the optical element driving mechanism 1.

As shown in FIG. 4, the holder 30 includes three stopping portions 33. The sensed object 81 is disposed on one of the corners of the holder 30, and the three stopping portions 33 of the holder 30 are disposed on the other three corners of the holder 30. As shown in FIG. 5, the circuit assembly 60 includes three concave portions 63. As shown in FIG. 6, the bottom 70 includes three recesses 73. When the holder 30, the circuit assembly 60, and the bottom 70 arranged in a stack, the sensed object 81 disposed on the holder 30 corresponds to the sensor 82 disposed on the bottom 70. The three stopping portions 33 correspond to the three concave portions 63 of the circuit assembly 60 and the three recesses 73 of the bottom 70.

The stopping portions 33 may restrict the range of motion of the holder 30 relative to the bottom 70. As shown in FIG. 7, when the holder 30 moves, the stopping portions 33 pass through the concave portions 63 of the circuit assembly 60 and are not blocked by the circuit assembly 60. Specifically, when the holder 30 moves toward the bottom 70, a portion of the stopping portions 33 is located in the concave portions 63. At the same time, when viewed along a direction that is perpendicular to the main axis M, the stopping portions 33 partially overlap the circuit assembly 60.

When the driving assembly 40 drives the holder 30 to move along the optical axis O and reach the limit, the stopping portions 33 contact the recesses 73 of the bottom 70, and thus the rest of the portions of the holder 30 cannot contact the bottom 70 so as to prevent the rest of the portions of the holder 30 from colliding with the bottom 70. Therefore, the holder 30 and the optical element 2 therein don't get damaged because the bottom 70 does not collide with bottom 70 thanks to the stopping portions 33.

Furthermore, the number and the positions of the stopping portions 33 may be adjusted. There may be one or more stopping portions 33. For example, in this embodiment, there are three stopping portions 33, so there are three contact areas between the three stopping portions 33 and the bottom 70. In such an embodiment, three contact areas may effectively attribute collision force and enhance the stability of the optical element driving mechanism 1. Additionally, in this embodiment, the stopping portions 33 are part of the holder 30 and the recesses 73 that are in contact with the stopping portions 33 are part of the bottom 70. However, the bottom 70 may include a stopping portion (not shown) to substitute the recesses 73, so that the stopping portions 33 of the holder 30 correspond to the stopping portion of the bottom 70. Alternatively, only one of the holder 30 and the bottom 70 includes one or more stopping portions. For example, the sensor 82 is disposed in one of the corners of the bottom 70 while the one or more stopping portions are disposed in the other corners of the bottom 70.

Additionally, as shown in FIG. 6, the bottom 70 includes four supporting platforms 75. The height of the supporting platforms 75 is higher than that of the rest of the portions of the bottom 70. That is, the supporting platforms 75 are closer to the top surface 11 of the case 10 than the rest of the portions of the bottom 70. When viewed along the main axis M, the supporting platforms 75 do not overlap the sensor 82. The functions of the supporting platforms 75 will be described further in the following content.

Figure 8:
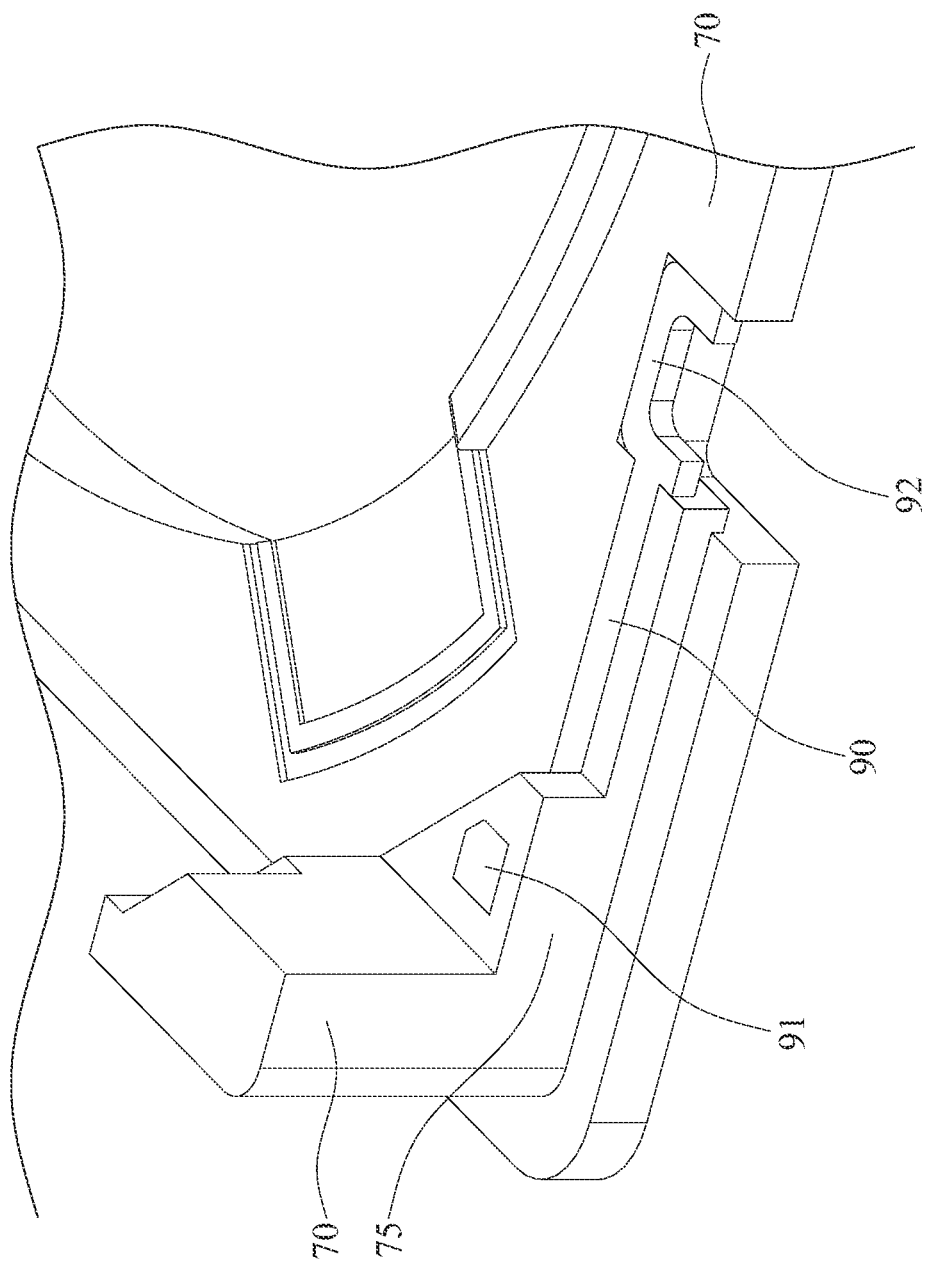
FIG. 8 is a perspective view of a portion of the bottom.

FIG. 8 is a perspective view of a portion of the bottom 70. In the following drawings, only one of the supporting platforms 75 is shown. The optical element driving mechanism 1 further includes a loop member 90. A portion of the loop member 90 is embedded in the bottom 70 by insert molding and the like. The loop member 90 including a first electrical connection portion 91 and a second electrical connection portion 92 is used as the conduction wire of the bottom 70 to be electrically connected to other elements. As shown in FIG. 8, the first electrical connection portion 91 is revealed from the supporting platform 75 of the bottom 70.

Figure 9:
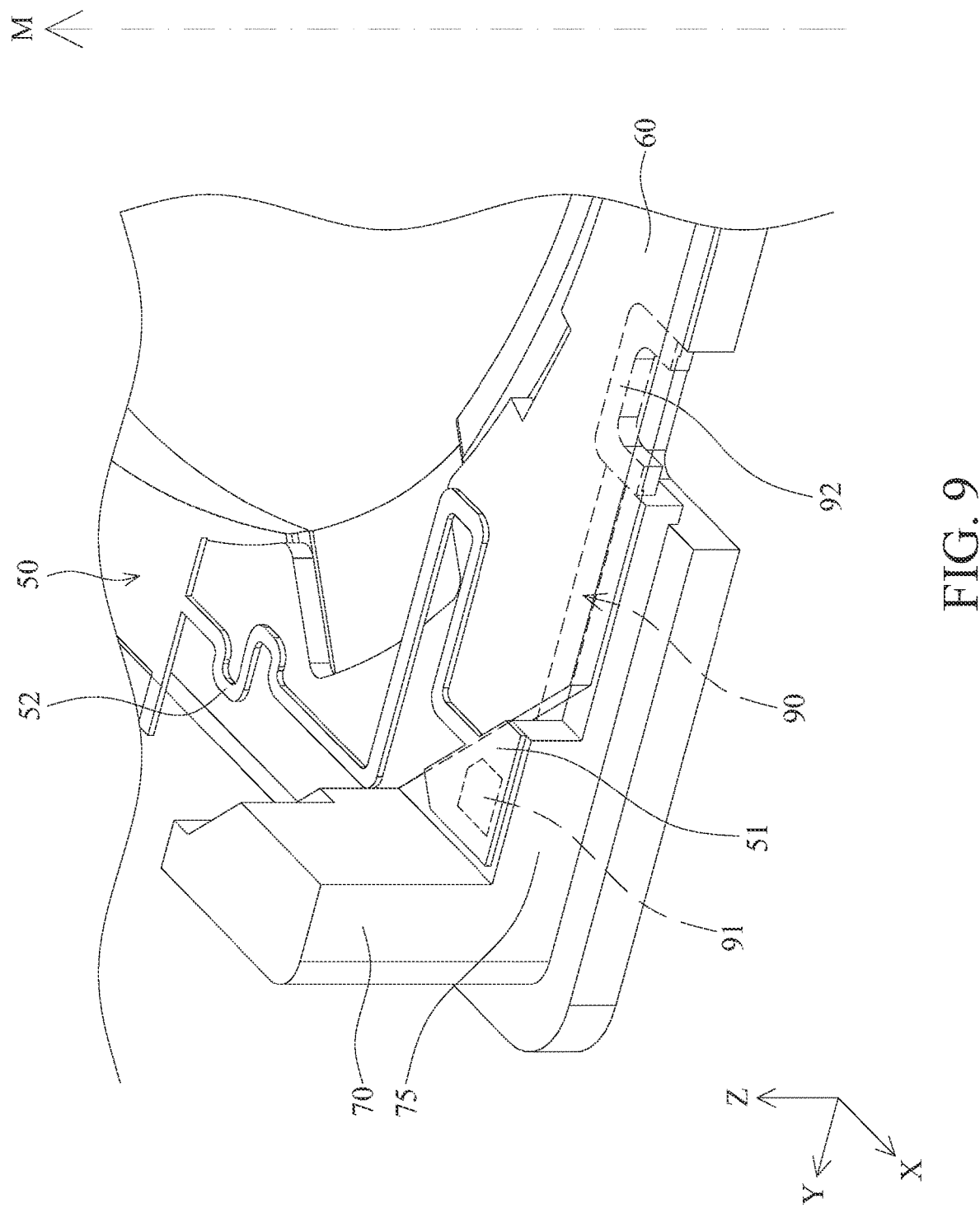
FIG. 9 is a perspective view of a portion of a second elastic element, the circuit assembly and the bottom.
Figure 10:
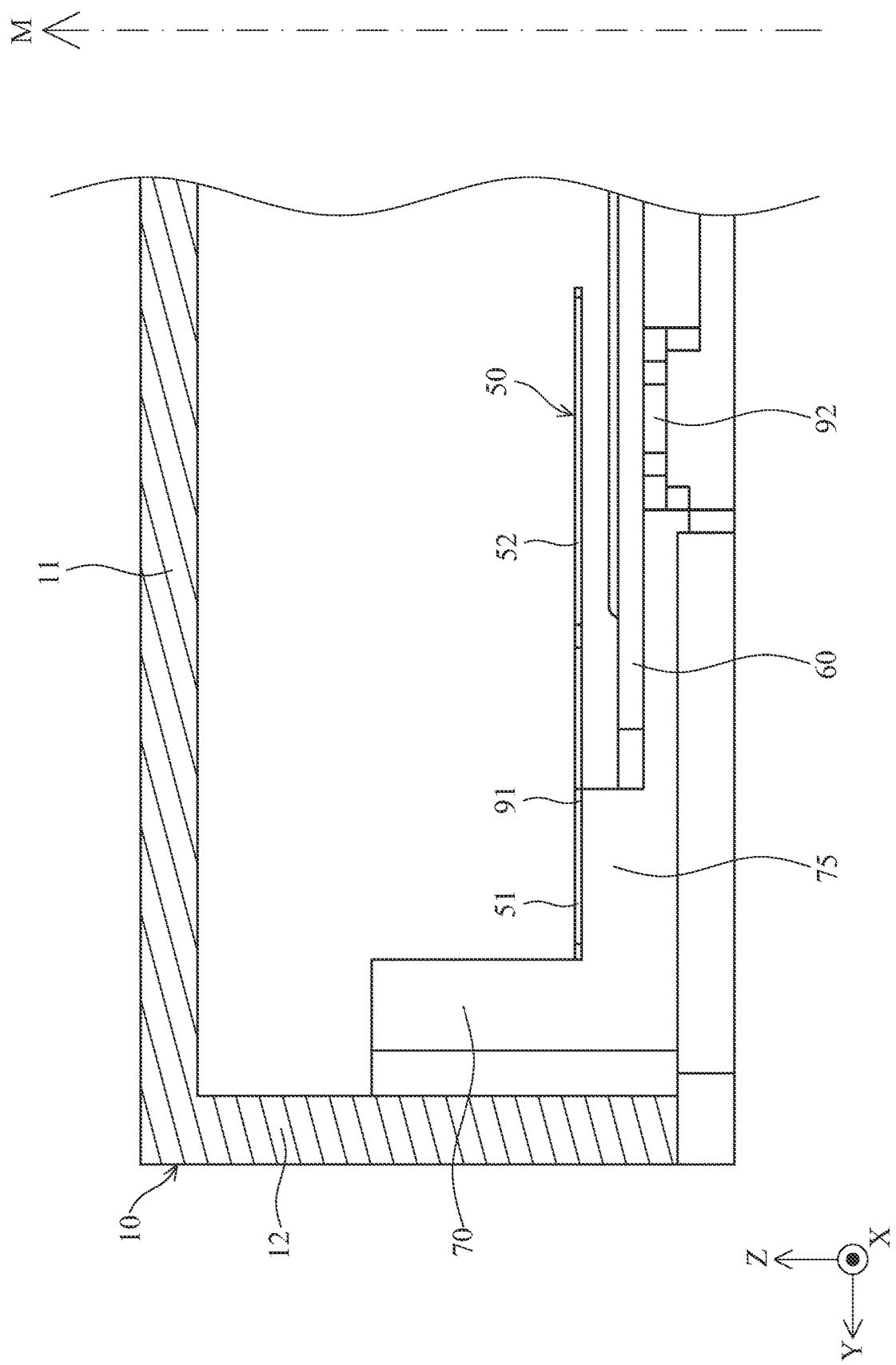
FIG. 10 is a schematic view of a portion of the optical element driving mechanism.

FIG. 9 is a perspective view of a portion of one of the second elastic elements 50, the circuit assembly 60 and the bottom 70. FIG. 10 is a schematic view of a portion of the optical element driving mechanism 1. FIG. 9 and FIG. 10 further illustrate the second elastic element 50 and the circuit assembly 60. As shown in FIG. 9, the second elastic element 50 includes a connection portion 51 and a deformation portion 52. The connection portion 51 is fixedly disposed on the supporting platform 75 of the bottom 70. Therefore, the deformation of the second elastic element 50 is mainly achieved by extending or shortening the deformation portion 52. Additionally, the deformation of the second elastic element 50 meets the target of holding the holder elastically together with the first elastic element 20. The supporting platform 75 does not overlap the circuit assembly 60 when viewed along the main axis M. Therefore, the first electrical connection portion 91 does not overlap the circuit assembly 60 when viewed along a direction that is perpendicular to the main axis M, either.

As shown in FIG. 9 and FIG. 10, the loop member 90 is electrically connected to the second elastic element 50 at the first electrical connection portion 91 and electrically connected to the circuit assembly 60 at the second electrical connection portion 92. The distance between the first electrical connection portion 91 and the top surface 11 of the case 10 in the direction of the main axis M is different than the distance between the second electrical connection portion 92 and the top surface 11 of the case 10 in the direction of the main axis M. Furthermore, the height of the supporting platform 75 is higher than the circuit assembly 60. That is, the supporting platform 75 is closer to the top surface 11 of the case 10 in the direction of the main axis M.

When the second elastic element 50 deforms, the second elastic element 50 does not contact the circuit assembly 60. It is because the connection portion 51 is disposed on the supporting platform 75 and the deformation portion 52 is spaced apart a distance from the circuit assembly 60. The problem of black spots on the images or video caused by the particle or debris generated by the collision of the elements is prevented by the existence of the supporting platform 75.

Figure 11:
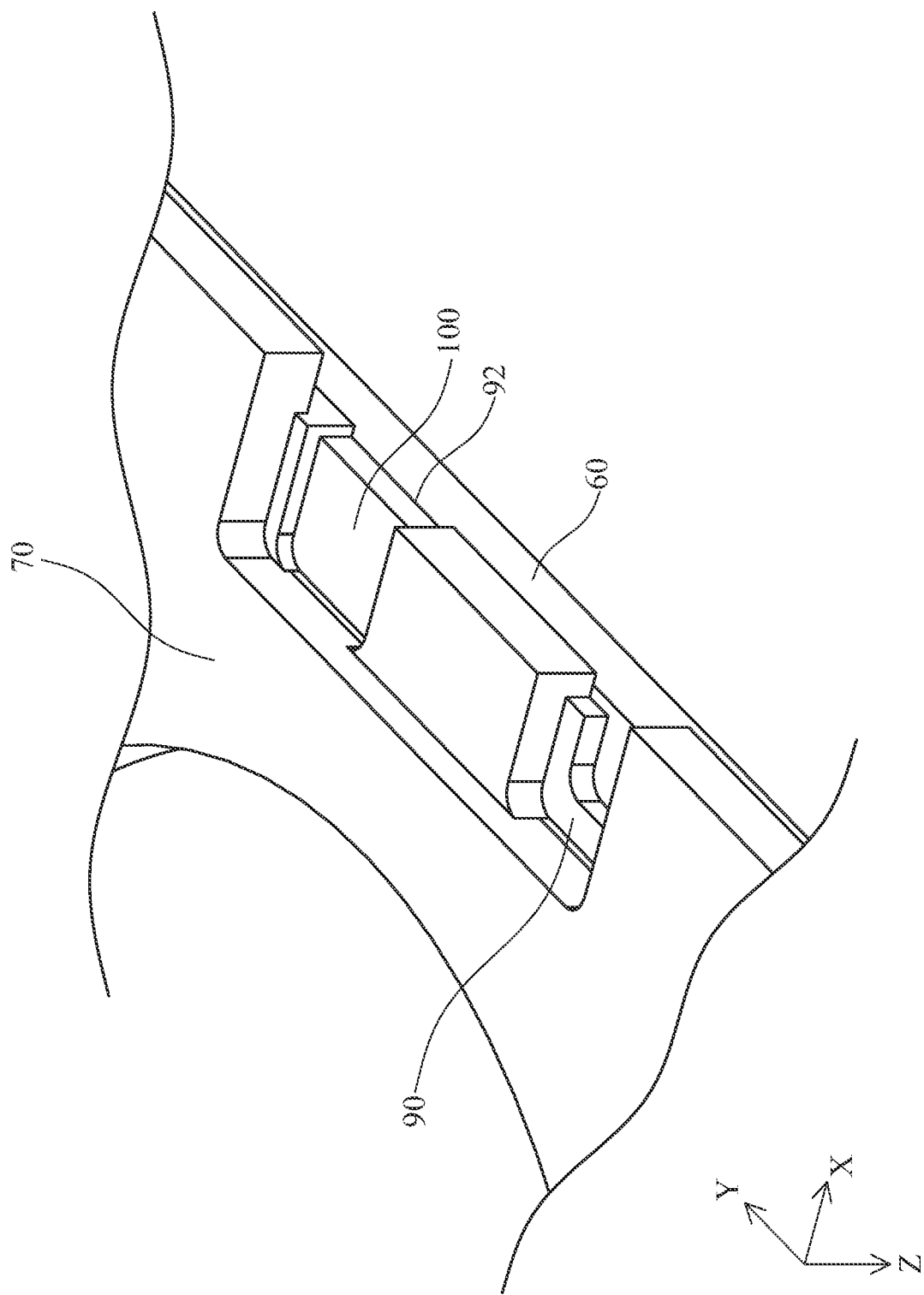
FIG. 11 and FIG. 12 are perspective views of a portion of the optical element driving mechanism.
Figure 12:
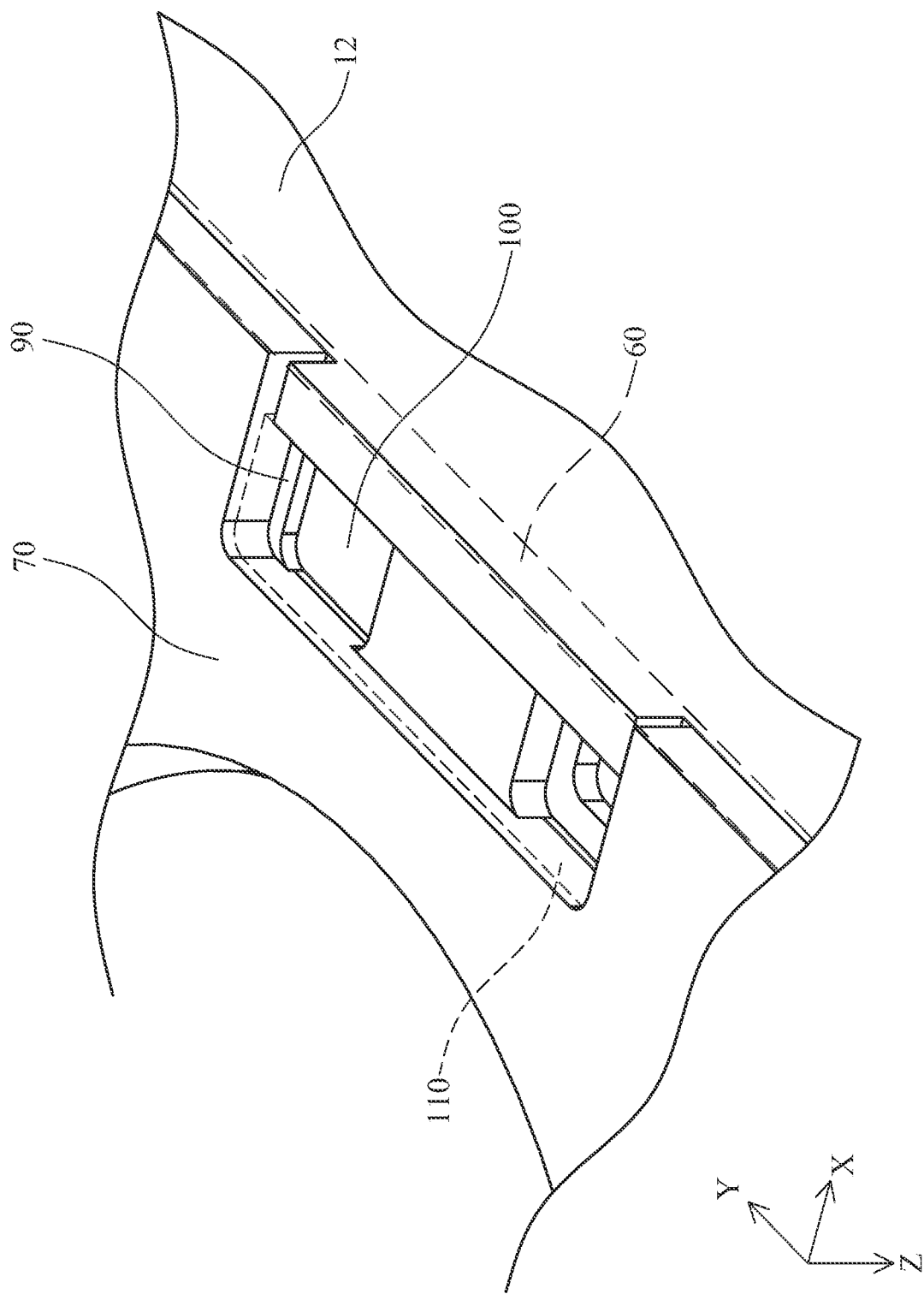

Next, how the loop member 90 is electrically connected to the circuit assembly 60 at the second electrical connection portion 92 will be described with reference to FIG. 11 and FIG. 12. FIG. 11 and FIG. 12 are perspective views of a portion of the optical element driving mechanism 1 illustrated in a different perspective. FIG. 11 and FIG. 12 show the optical element driving mechanism 1 from the bottom. The optical element driving mechanism 1 further includes an electrical connection piece 100. The electrical connection piece 100 may be any material (such as Tin) that may make any elements be electrically connected to other elements. A portion of the electrical connection piece 100 is disposed on the surface of the circuit assembly 60 which faces the bottom 70. The portion of the loop member 90 that revealed from the bottom surface of the bottom 70 is electrically connected to the circuit assembly 60 via the electrical connection piece 100. That is, the electrical connection piece 100 is disposed between the circuit assembly 60 and the bottom 70 to ensure the current passes through normally. In some embodiments, the electrical connection piece 100 may be omitted, and the circuit assembly 60 is electrically connected to the loop member 90 by any methods for making any elements be electrically connected to other elements such as fusion, application of conductive glue, and the like.

The optical element driving mechanism 1 may further include an adhesion element 110. Compared to FIG. 11, FIG. 12 further illustrates one of the sidewalls 12 of the case 10 and the adhesion element 110. When the case 10 is connected to the bottom 70, the sidewall 12 is close to a side of the electrical connection piece 100, so that the electrical connection piece 100 partially overlaps the sidewall 12 of the case 10 when viewed along a direction that is perpendicular to the main axis M. The adhesion element 110 may be an adhesion material or an insulating material such as resin. The adhesion element 110 is disposed between the circuit assembly 60 and the bottom 70. Additionally, the adhesion element 110 directly contacts the surface of the circuit assembly 60 and the surface of the bottom 70. In some embodiments, the adhesion element 110 directly contacts the case 10 to strengthen the connection between the case 10 and the bottom 70.

As shown in FIG. 12, the adhesion element 110 directly contacts the electrical connection piece 100 and covers the electrical connection piece 100. Normally, the adhesion element 110 has good elasticity and good covering ability and thus the adhesion element 110 may protect the electrical connection piece 100, i.e. the position where the circuit assembly 60 is electrically connected to the loop member 90. Additionally, the adhesion element 110 may reduce the probability of particles such as dust or mist entering the optical element driving mechanism 1. If the adhesion element 110 is made of insulating material, insulation may be achieved. The steps for applying the adhesion element 110 is normally referred to as "glue dispensing", which may be conducted manually or mechanically.

Figure 13:
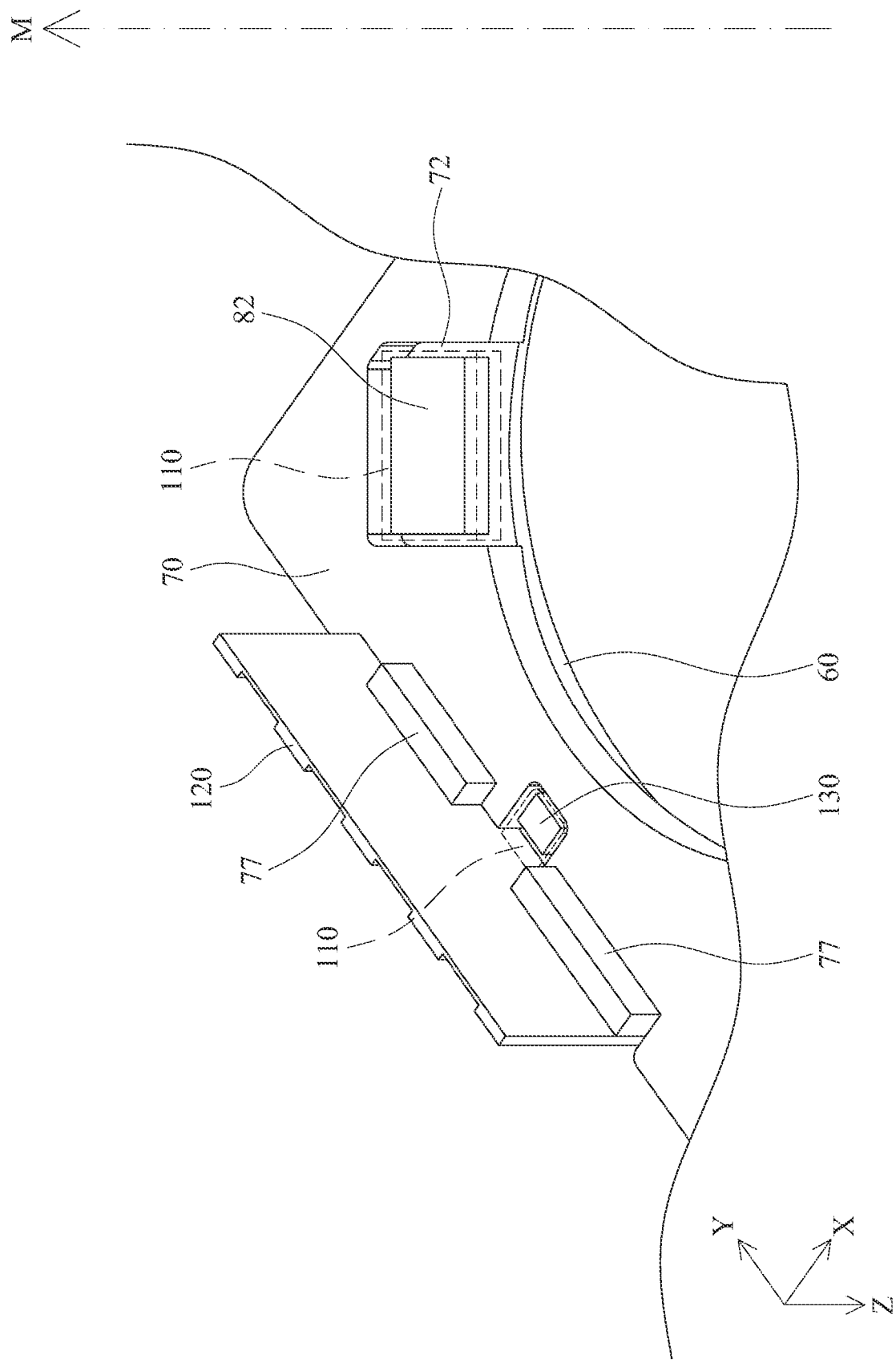
FIG. 13 is a schematic view of an outside-connection circuit member and an electronic element.

FIG. 13 is a perspective view of a portion of the bottom 70 illustrated in another different perspective to show the outside-connection circuit member 120 and an electronic element 130. The sensor 82 partially overlaps the bottom 70 when viewed along a direction that is perpendicular to the main axis M. Additionally, the bottom surface of the bottom 70 is farther away from the top surface 11 of the case 10 than the bottom surface of the sensor 82 in the direction of the main axis M, so that the receiving portion 72 may protect the sensor 82. In some embodiments, the size of the sensor 82 in the direction of the main axis M is smaller than the receiving portion 72 of the bottom 70 in the direction of the main axis M. Furthermore, the bottom surface of the bottom 70 is farther away from the top surface 11 of the case 10 than the bottom surface of the sensor 82. Furthermore, the sensor 82 is disposed in the receiving portion 72 and thus other spaces are not occupied, which is also advantageous for miniaturization of the optical element driving mechanism 1. Also, the adhesion element 110 may also be disposed in the receiving portion 72 to further strengthen the structure of the optical element driving mechanism 1. Under such circumstances, the adhesion element 110 directly contacts the sensor 82, the circuit assembly 60, and the bottom 70.

As shown in FIG. 13, the optical element driving mechanism 1 further includes the electronic element 130. The bottom 70 includes two baffles 77. The baffles 77 contact the outside-connection circuit member 120 to increase the structural strength. The electronic element 130 may be a capacitance, an inductance, a filter, an integrated circuit, and the like. The electronic element 130 is disposed on a side of the circuit assembly 60 which is close to the outside-connection circuit member 130. Similarly, the adhesion element 110 may also be disposed on the electronic element 130, so that the adhesion element 110 directly contacts the circuit assembly 60 and the electronic element 130.

As described above, the adhesion element 110 may adhere several elements to each other at the same time by only applying the adhesion element 110 (i.e. glue dispensing) one time. By such operation, the process is simplified, the production efficiency is enhanced, and the adhesion strength is increased.

Figure 14:
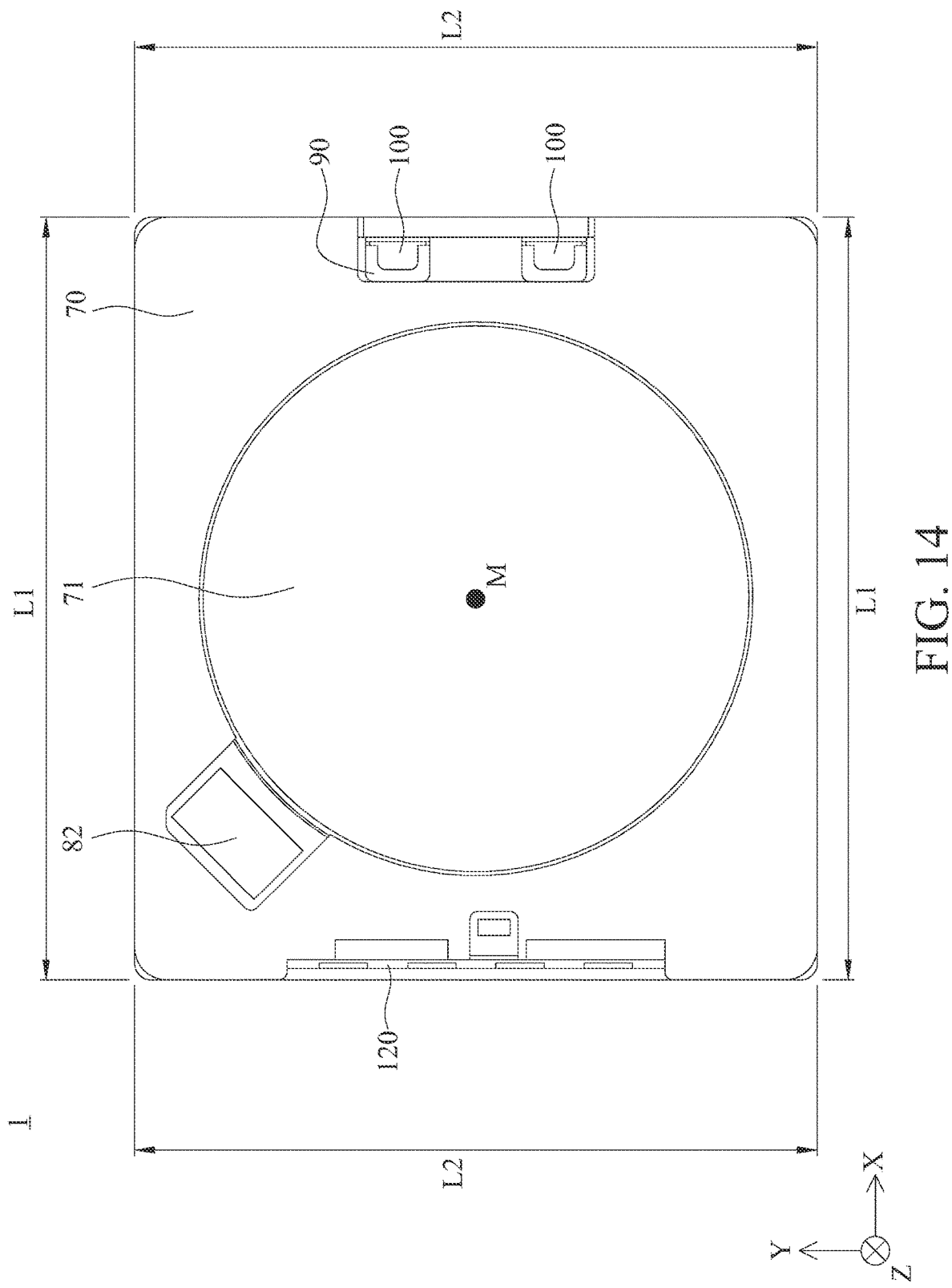
FIG. 14 is a bottom view of the optical element driving mechanism.

FIG. 14 is a bottom view of the optical element driving mechanism 1, which shows the whole bottom 70 while FIG. 11 to FIG. 13 only illustrate a portion of the bottom 70. As shown in FIG. 14, the bottom 70 is rectangular, including two opposite long sides L1 and two opposite short sides L2. For example, each of the long sides L1 may be 9.5 mm, and each of the short sides L2 may be 8.5 mm. The loop member 90 and the outside-connection circuit member 120 are respectively disposed on the two opposite short sides L2 to avoid increasing the length of the long sides L1 and enhance the usage of the space to achieve miniaturization.

Figure 15:
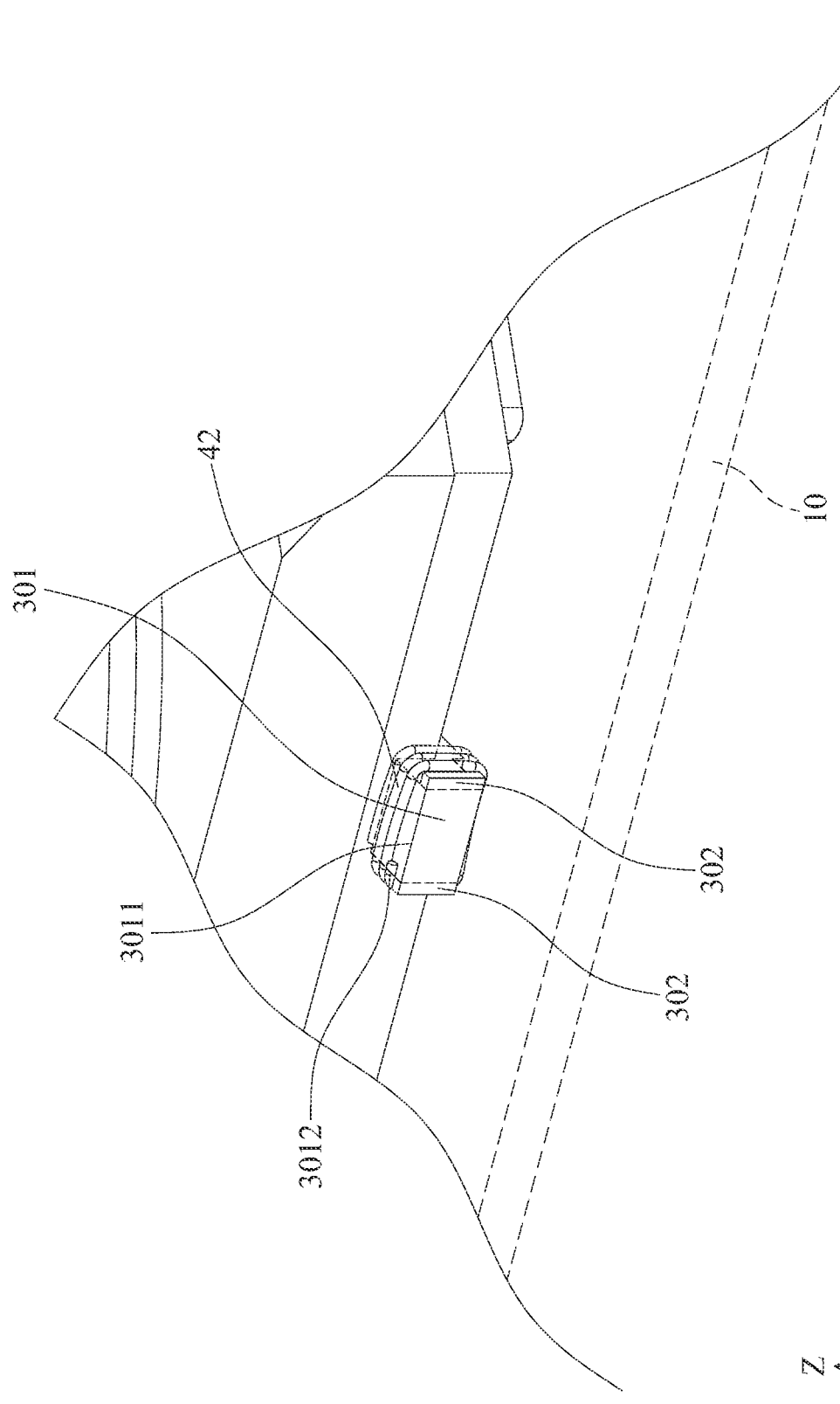
FIG. 15 is a perspective view of a portion of the holder.

FIG. 15 is a perspective view of a portion of the holder 30. The holder 30 includes two protrusions 301 located on opposite sides of the holder 30 and extends toward the sidewall 12 of the case 10. For simplicity, only one of the protrusions 301 and one of the coils 42 are shown here. A portion of the coil 42 surrounds the protrusion 301. For example, the lead extending from the coil 42 winds the protrusion 301, so that the coil 42 may be electrically connected to other elements. When viewed along the main axis M, the top surface of protrusion 301 is rectangular including two opposite long sides 3011 and two opposite short sides 3012. Also, when viewed along a direction that is perpendicular to the main axis M, the cross-section of the protrusion 301 is also rectangular, and the ratio of the long side of the cross-section of the protrusion 301 to the short side of the cross-section of the protrusion 301 is between about 1.5 to about 3.0. If the ratio of the long side of the cross-section of the protrusion 301 to the short side of the cross-section of the protrusion 301 is less than 1.5, for example, the ratio of the long side of the cross-section of the protrusion 301 to the short side of the cross-section of the protrusion 301 is 1.0 and thus the cross-section of protrusion 301 is square-shaped, the lead may drop off the protrusion 301 because the lead may rotate easily. If the ratio of the long side of the cross-section of the protrusion 301 to the short side of the cross-section of the protrusion 301 is greater than 3.0, then the protrusion 301 may be too big and be disadvantageous for miniaturization of the optical element driving mechanism 1.

To prevent the lead from dropping off, the protrusion 301 further includes two projections 302 disposed on the edge of the protrusion 301. Particularly, the projections 302 are disposed on the short side of the rectangular top surface of the protrusion 301. That is, when viewed from the extending direction of the protrusion 301, the projections 302 are disposed on the short sides 3012 of the protrusion 301. However, there may be only one projection 302, or, the projections 302 may be omitted. When viewed along the main axis M, the profile of the protrusion 301 and the projections 302 is substantially T-shaped.

Figure 16:
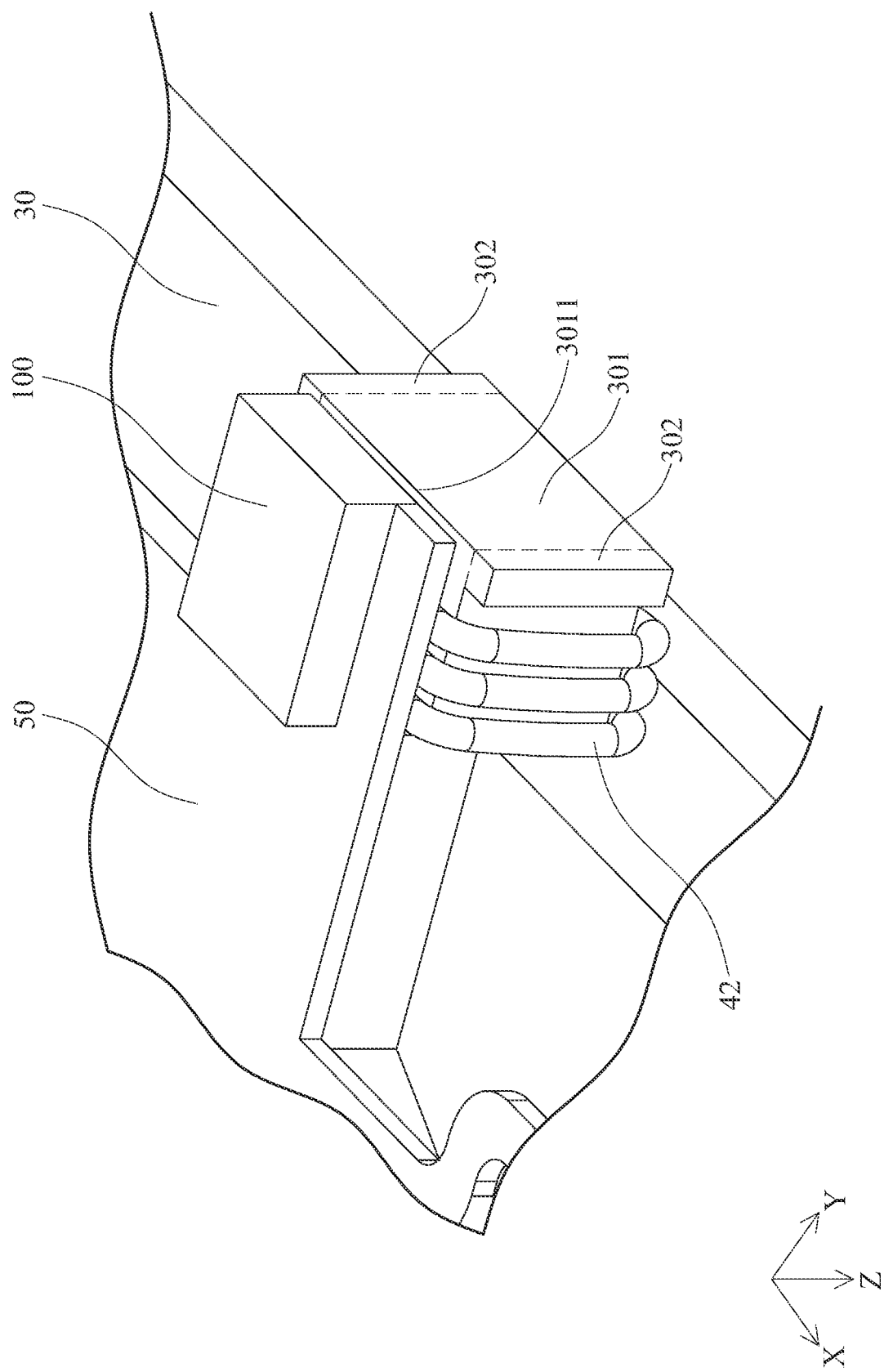
FIG. 16 is a perspective view of a portion of the holder and the second elastic element.

FIG. 16 is a perspective view of a portion of the holder 30 and the second elastic element 50. A portion of the second elastic element 50 is disposed on the top surface of the protrusion 301 and abuts the edge of the protrusion 301. Particularly, the second elastic element 50 abuts the long side of the rectangular top surface of the protrusion 301. That is, when viewed from the extending direction of the protrusion 301, a portion of the second elastic element 50 is disposed on the long side 3011 of the protrusion 301, so the second elastic element 50 may have greater mechanical strength. The electrical connection piece 100 may be disposed on the top surface of the protrusion 301, so that the coil 42 is electrically connected to the second elastic element 50.

How the current passes through the optical element driving mechanism 1 is described in detail herein. The outside-connection circuit member 120 is connected to a power supply (not shown) outside the optical element driving mechanism 1. The outside-connection circuit member 120 includes several pins for the current to flow in or flow out. The direction of the current is controlled according to the desired movement direction for correction, for example, whether the holder 30 moves toward or away from the bottom 70.

The current first flows through the circuit in the circuit assembly 60 that connects to the outside-connection circuit member 120 and flows through the sensor 82 disposed in the circuit assembly 60. Next, the current flows to the loop member 90 via the second electrical connection portion 92, and then the current flows to the second elastic element 50 via the first electrical connection portion 91. As shown in FIG. 16, the second elastic element 50 is electrically connected to the coil 42 at the protrusion 301 of the holder 30. Therefore, the current flows to the coils 42 so as to generate electromagnetic force with the magnetic elements 41. Next, the current flows to the protrusion 301 on the opposite side, and flows through the coil 42 on the opposite side, the second elastic element 50, the loop member 90, the circuit assembly 60, and the outside-connection circuit member 120 consecutively. Finally, the current flows out the optical element driving mechanism 1. To sum up, the outside-connection circuit member 120 is electrically connected to the sensor 82 via the circuit assembly 60. Also, the sensor 82 is electrically connected to the driving assembly 40 via the current that consecutively flows through the circuit assembly 60, the loop member 90, and the second elastic element 50.

Next, some other different embodiments will be described. Additionally, the same elements are denoted by the same symbols, similar elements are denoted by similar symbols, and related contents are not repeated.

Figure 17:
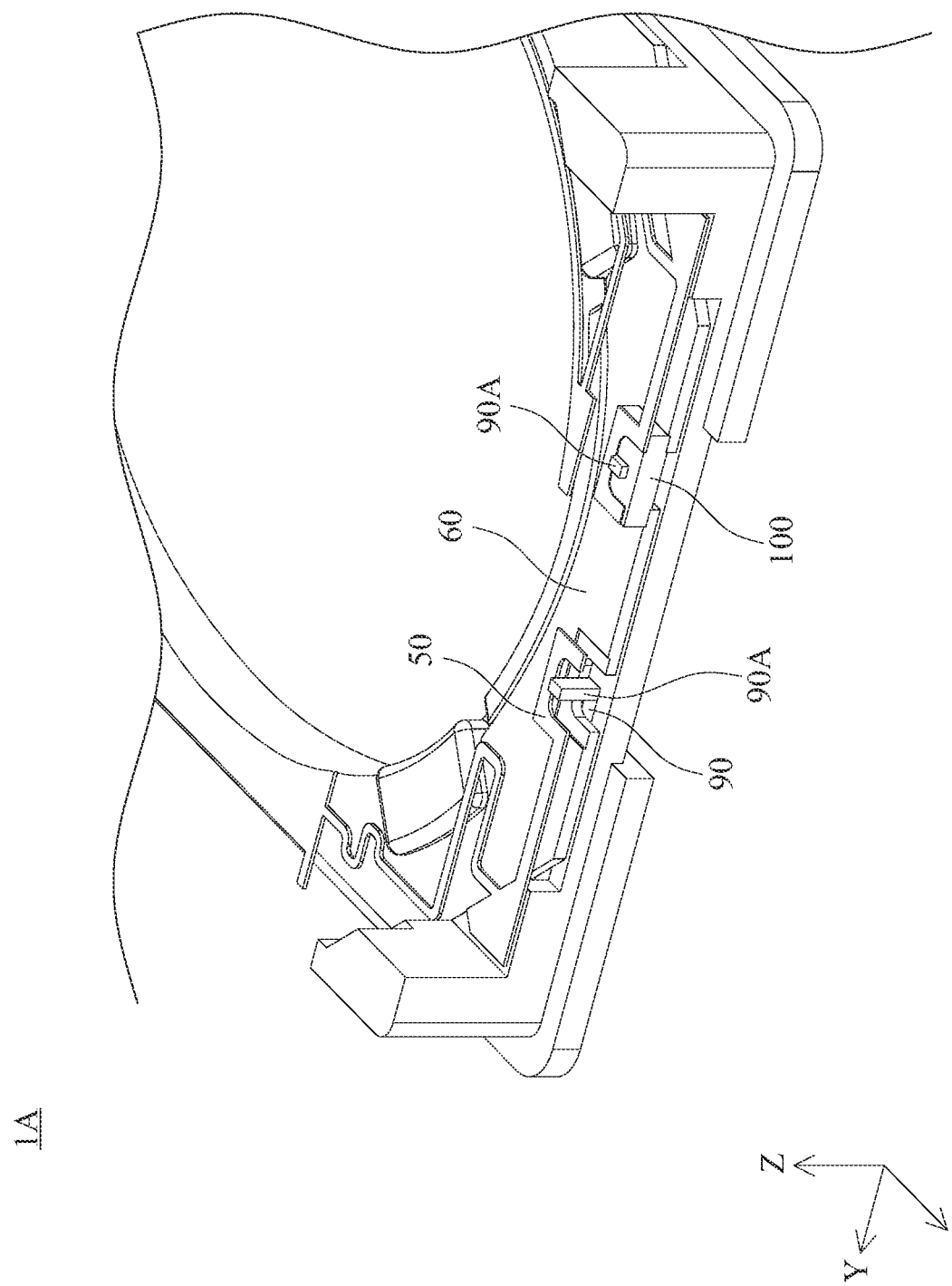
FIG. 17 is perspective view of an optical element driving mechanism in accordance with some other embodiments of this disclosure.

FIG. 17 is perspective view of a portion of an optical element driving mechanism 1A in accordance with some other embodiments of this disclosure. The difference between the optical element driving mechanism 1A and the optical element driving mechanism 1 is that the loop member 90 of the optical element driving mechanism 1A includes at least one projecting portion 90A corresponding to the second elastic element 50 and the circuit assembly 60 at the same time. Under such circumstances, the electrical connection piece 100 directly contacts the second elastic element 50, the circuit assembly 60, and the loop member 90 to make aforementioned elements be electrically connected to each other by only applying the electrical connection piece 100 (e.g. Tin welding) one time without applying the electrical connection piece 100 more than one time at different positions respectively (such as the first electrical connection portion 91 and the second electrical connection portion 92 as shown in FIG. 10). Therefore, the process is simplified and the production efficiency is enhanced. For the convenience of illustration, there are two projecting portions 90A in FIG. 17, but only one electrical connection piece 100 is shown.

Figure 18:
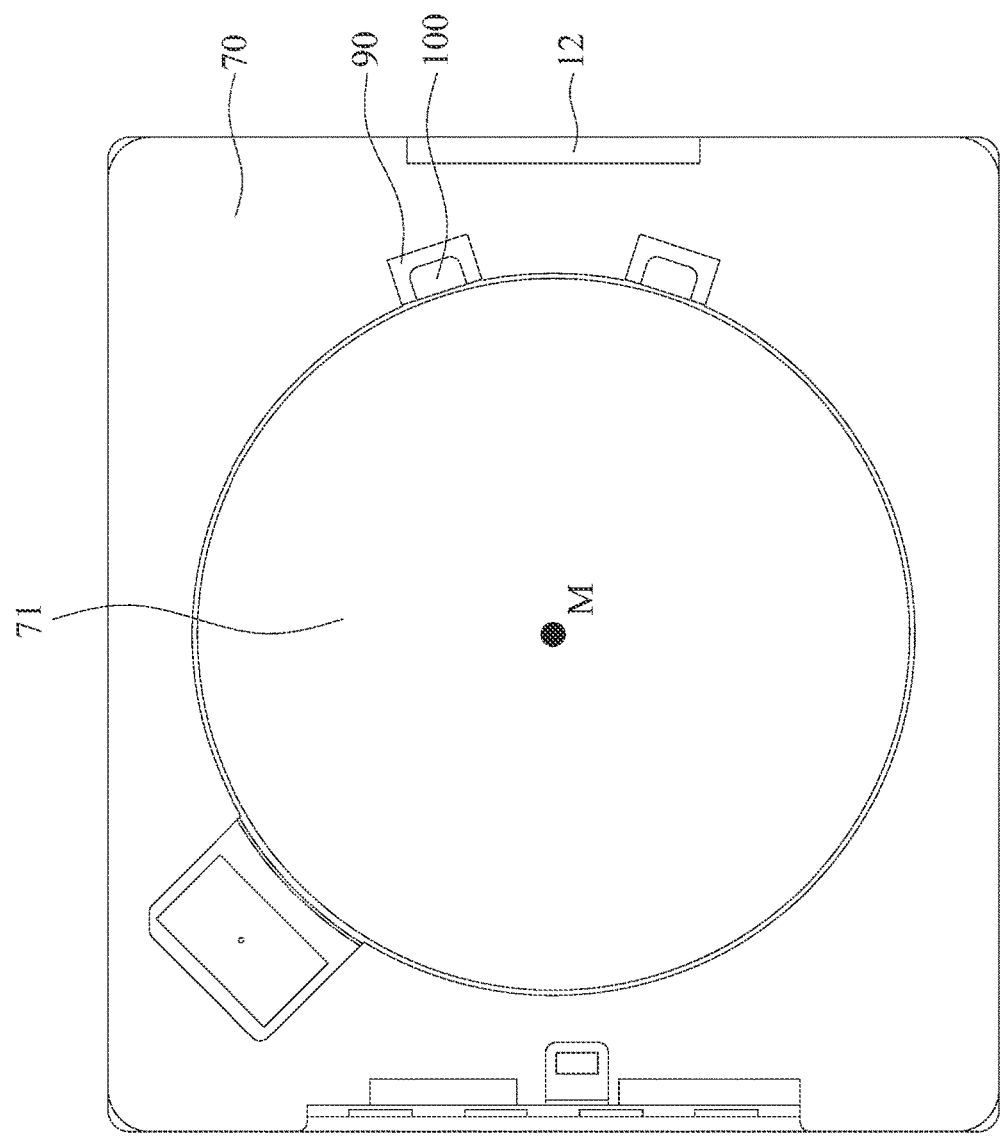
FIG. 18 is a bottom view of an optical element driving mechanism in accordance with some other embodiments of this disclosure.

FIG. 18 is a bottom view of an optical element driving mechanism 1B in accordance with some other embodiments of this disclosure. Please also refer to FIG. 14 in order to understand the difference between the optical element driving mechanism 1B and the optical element driving mechanism 1. The difference between the optical element driving mechanism 1B and the optical element driving mechanism 1 is that the loop member 90 is electrically connected to the circuit assembly 60 at the position that is close to the opening 71 of the bottom 70. Therefore, the electrical connection piece 100 is disposed on the edge of the opening 71 of the bottom 70, and a portion of the bottom 70 is located between the electrical connection piece 100 and the sidewall 12 of the case 10. When the case 10 is made of metal, short cut caused by the contact between the electrical connection piece 100 and the sidewall 12 of the case is prevented by such configuration. In other words, the position where the loop member 90 is electrically connected to the circuit assembly 60 may be configured arbitrarily with regard to the factors such as the material of the case 10.

Figure 19:
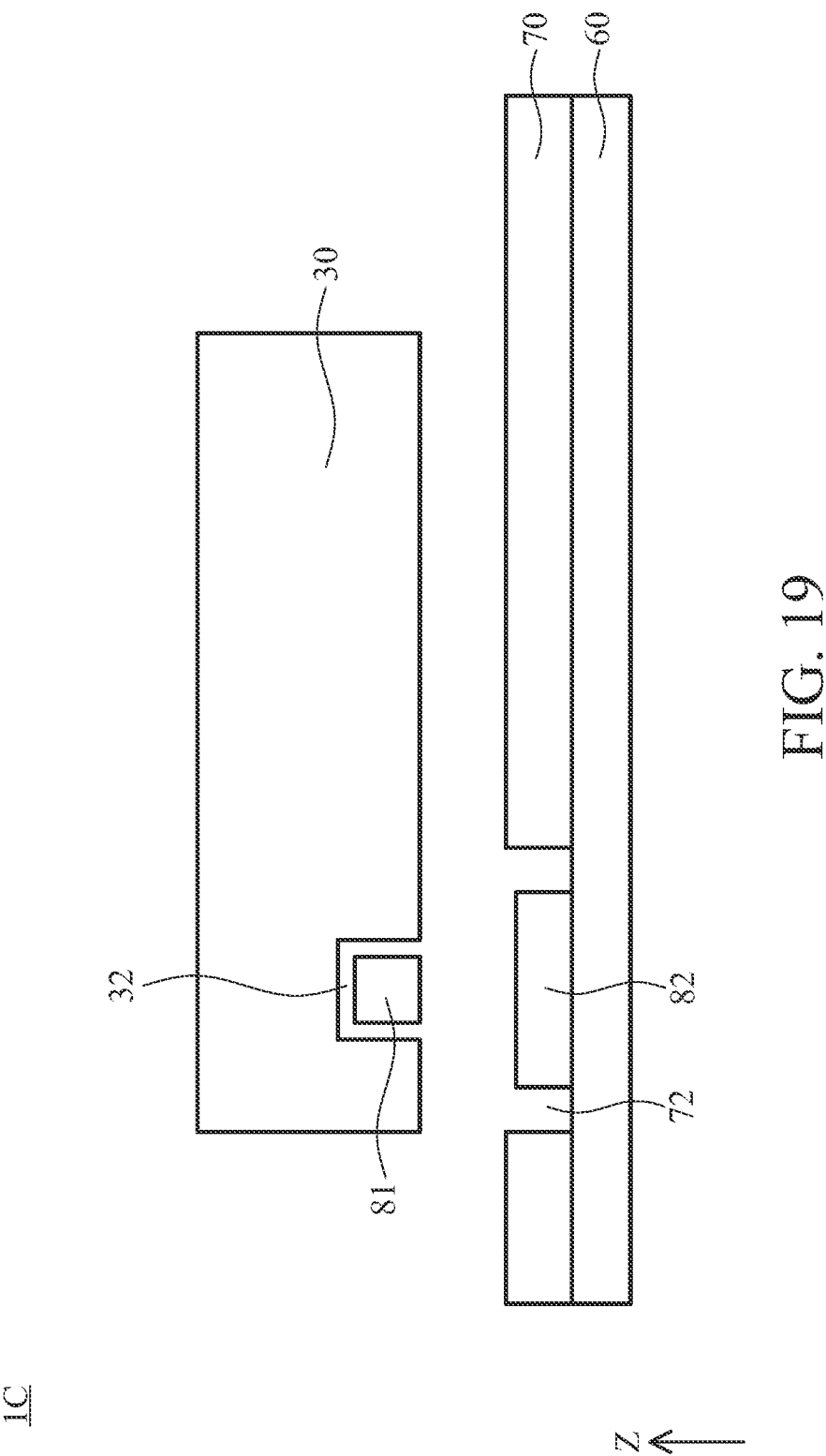
FIG. 19 is a schematic view of an optical element driving mechanism in accordance with some other embodiments of this disclosure.

FIG. 19 is a schematic view of an optical element driving mechanism 1C in accordance with some other embodiments of this disclosure. Please also refer to FIG. 3 in order to understand the difference between the optical element driving mechanism 1C and the optical element driving mechanism 1. In this embodiment, the circuit assembly 60 of the optical element driving mechanism 1C is disposed under the bottom 70. However, the sensor 82 is mounted on the surface of the circuit assembly 60 that faces the bottom 70 by SMT and the like. The sensor 82 is received in the receiving portion 72 of the bottom 70.

Figure 20:
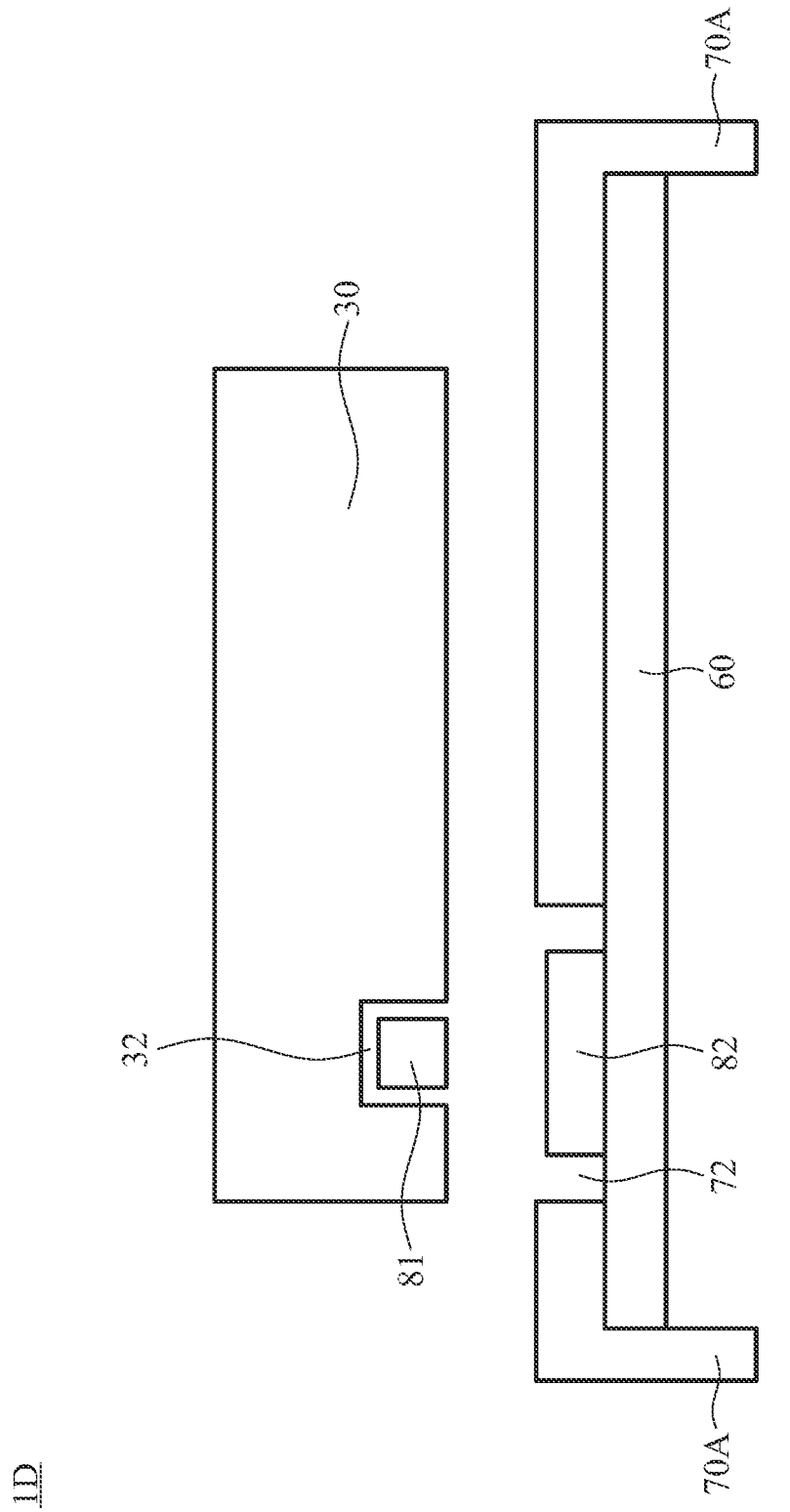
FIG. 20 is a schematic view of an optical element driving mechanism in accordance with some other embodiments of this disclosure.

FIG. 20 is a schematic view of an optical element driving mechanism 1D in accordance with some other embodiments of this disclosure. FIG. 20 is a variant of FIG. 19. In this embodiment, the bottom 70 of the optical element driving mechanism 1D further includes two extending portions 70A. The circuit assembly 60 is disposed between the spaces between the extending portions 70A to prevent the circuit assembly 60 from being damaged because the circuit assembly 60 contacts or collides with other elements.

As described above, an optical element driving mechanism is provided. The case may be made of metal material or non-metal material. When the case is made of metal, electromagnetic wave interference may be isolated. The bottom is rectangular. The circuit assembly is disposed on the bottom to achieve miniaturization. The sensor is disposed on the circuit assembly to sense the sensed object and enhance the sensing accuracy. Furthermore, the bottom includes the corresponding receiving portion to protect the sensor.

The foregoing outlines features of several embodiments so that those skilled in the art may better understand the aspects of this disclosure. Those skilled in the art should appreciate that they may readily use this disclosure as a basis for designing or modifying other processes and structures for carrying out the same purposes and/or achieving the same advantages of the embodiments introduced herein. Those skilled in the art should also realize that such equivalent constructions do not depart from the spirit and scope of this disclosure, and that they may make various changes, substitutions, and alterations herein without departing from the spirit and scope of this disclosure. In addition, the scope of this disclosure is not limited to the specific embodiments described in the specification, and each claim constitutes a separate embodiment, and the combination of various claims and embodiments are within the scope of the disclosure.

What is claimed is:

1. An optical element driving mechanism, comprising:
a bottom;
a movable part connected to an optical element with an optical axis, wherein the movable part is movable relative to the bottom;
a driving assembly driving the movable part to move relative to the bottom;
a first circuit assembly disposed on the bottom and electrically connected to the driving assembly; and
a second circuit assembly electrically connected to the driving assembly, wherein at least part of the second circuit assembly is embedded in and not revealed from the bottom;
wherein the driving assembly is electrically connected to the first circuit assembly via the second circuit assembly;
wherein the first circuit assembly has a plate-like structure, and the first circuit assembly comprises a first portion and a second portion that are not parallel with each other.

2. The optical element driving mechanism as claimed in claim 1, wherein the first portion is perpendicular to the second portion.

3. The optical element driving mechanism as claimed in claim 1, wherein the bottom comprises a baffle, the baffle is in contact with the second portion, and the baffle is not in contact with the first portion.

4. The optical element driving mechanism as claimed in claim 1, wherein the second portion comprises a plurality of pins, and current is supplied to the first circuit assembly via the pins.

5. The optical element driving mechanism as claimed in claim 1, further comprising a sensing assembly sensing a movement condition of the movable part relative to the bottom, wherein the sensing assembly comprises a sensor disposed on the bottom.

6. The optical element driving mechanism as claimed in claim 5, wherein the sensor partially overlaps the bottom when viewed along a direction that is perpendicular to the optical axis.

7. The optical element driving mechanism as claimed in claim 5, wherein the bottom comprises a receiving portion, and the sensor is disposed on the receiving portion.

8. The optical element driving mechanism as claimed in claim 5, further comprising an adhesion element, wherein the adhesion element is in direct contact with the sensor and the first circuit assembly.

9. An optical element driving mechanism, comprising:
a bottom,
a movable part connected to an optical element with an optical axis, wherein the movable part is movable relative to the bottom;
a driving assembly driving the movable part to move relative to the bottom;
a first circuit assembly disposed on the bottom and electrically connected to the driving assembly; and
a second circuit assembly electrically connected to the driving assembly, wherein at least part of the second circuit assembly is embedded in and not revealed from the bottom;
wherein the driving assembly is electrically connected to the first circuit assembly via the second circuit assembly;
wherein the second circuit assembly comprises a first electrical connection portion and a second electrical connection portion that are located at different heights.

10. The optical element driving mechanism as claimed in claim 9, wherein the first electrical connection portion is revealed from the bottom, and the second electrical connection portion is not revealed from the bottom.

11. The optical element driving mechanism as claimed in claim 9, wherein the first electrical connection portion does not overlap the first circuit assembly when viewed along a direction that is perpendicular to the optical axis.

12. The optical element driving mechanism as claimed in claim 9, wherein the bottom further comprises a supporting platform, and the first electrical connection portion is disposed on the supporting platform.

13. The optical element driving mechanism as claimed in claim 12, further comprising an elastic element, wherein the movable part is movably connected to the bottom via the elastic element, the elastic element comprises a connection portion disposed on the supporting platform, and the connection portion is in contact with the first electrical connection portion.

14. The optical element driving mechanism as claimed in claim 9, further comprising a case connected to the bottom, wherein a distance between a top surface of the case and the first electrical connection portion is different from a distance between the top surface of the case and the second electrical connection portion.

15. The optical element driving mechanism as claimed in claim 14, wherein the distance between the top surface of the case and the first electrical connection portion is less than the distance between the top surface of the case and the second electrical connection portion.

16. An optical element driving mechanism, comprising:
a bottom;
a case connected to the bottom;
a movable part connected to an optical element with an optical axis, wherein the movable part is movable relative to the bottom;
a driving assembly driving the movable part to move relative to the bottom;
a first circuit assembly disposed on the bottom and electrically connected to the driving assembly; and
a second circuit assembly electrically connected to the driving assembly, wherein at least part of the second circuit assembly is embedded in and not revealed from the bottom;
wherein the driving assembly is electrically connected to the first circuit assembly via the second circuit assembly;
wherein the bottom comprises a supporting platform, and a distance between a top surface of the case and the supporting platform is different from a distance between the top surface of the case and the first circuit assembly.

17. The optical element driving mechanism as claimed in claim 16, wherein the distance between the top surface of the case and the supporting platform is less than the distance between the top surface of the case and the first circuit assembly.

18. An optical element driving mechanism, comprising:
a bottom;
a movable part connected to an optical element with an optical axis, wherein the movable part is movable relative to the bottom;
a driving assembly driving the movable part to move relative to the bottom;
a first circuit assembly disposed on the bottom and electrically connected to the driving assembly;

a second circuit assembly electrically connected to the driving assembly, wherein at least part of the second circuit assembly is embedded in and not revealed from the bottom;
an electronic element disposed on the first circuit assembly; and
an adhesion element;
wherein the driving assembly is electrically connected to the first circuit assembly via the second circuit assembly;
wherein the adhesion element is in direct contact with the electronic element and the first circuit assembly.

19. An optical element driving mechanism, comprising:
a bottom;
a movable part connected to an optical element with an optical axis, wherein the movable part is movable relative to the bottom;
a driving assembly driving the movable part to move relative to the bottom;
a first circuit assembly disposed on the bottom and electrically connected to the driving assembly; and
a second circuit assembly electrically connected to the driving assembly, wherein at least part of the second circuit assembly is embedded in and not revealed from the bottom;
wherein the driving assembly is electrically connected to the first circuit assembly via the second circuit assembly;
wherein the driving assembly partially overlaps the first circuit assembly when viewed along the optical axis.

20. The optical element driving mechanism as claimed in claim 19, wherein the second circuit assembly comprises a first electrical connection portion revealed from the bottom, and the first electrical connection portion does not overlap the first circuit assembly when viewed along a direction that is perpendicular to the optical axis.

* * * * *